(12) United States Patent
Chen et al.

(10) Patent No.: US 12,436,638 B2
(45) Date of Patent: Oct. 7, 2025

(54) DISPLAY SUBSTRATE AND DISPLAY DEVICE

(71) Applicants: Chengdu BOE Optoelectronics Technology Co., Ltd., Chengdu (CN); BOE TECHNOLOGY GROUP CO., LTD., Beijing (CN)

(72) Inventors: Youchun Chen, Beijing (CN); Dan Guo, Beijing (CN); Shuo Li, Beijing (CN); Hongcheng Gao, Beijing (CN); Jiandong Bao, Beijing (CN); Jiwei Wang, Beijing (CN); Sheng Guo, Beijing (CN); Peng Hou, Beijing (CN); Yue Liu, Beijing (CN)

(73) Assignees: Chengdu BOE Optoelectronics Technology Co., Ltd., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/800,045

(22) PCT Filed: Nov. 4, 2021

(86) PCT No.: PCT/CN2021/128698
§ 371 (c)(1),
(2) Date: Aug. 16, 2022

(87) PCT Pub. No.: WO2022/242048
PCT Pub. Date: Nov. 24, 2022

(65) Prior Publication Data
US 2024/0179989 A1    May 30, 2024

(30) Foreign Application Priority Data

May 19, 2021  (WO) ............... PCT/CN2021/094676
Jun. 29, 2021  (CN) ......................... 202110726472.5

(51) Int. Cl.
*H10K 59/35*   (2023.01)
*G06F 3/041*   (2006.01)
(Continued)

(52) U.S. Cl.
CPC ........ *G06F 3/04164* (2019.05); *G06F 3/0445* (2019.05); *G06F 3/047* (2013.01);
(Continued)

(58) Field of Classification Search
CPC ..................... H10K 59/121; H10K 59/1213
See application file for complete search history.

(56) References Cited

U.S. PATENT DOCUMENTS 10,209,568 B2   2/2019  Zhou
10,803,285 B2   10/2020 Zhao et al.
(Continued)

FOREIGN PATENT DOCUMENTS

CN   101266759 A   9/2008
CN   102280074 A   12/2011
(Continued)

OTHER PUBLICATIONS

U.S. Office Action in U.S. Appl. No. 17/789,674 dated Jul. 30, 2024.
(Continued)

*Primary Examiner* — Evren Seven
(74) *Attorney, Agent, or Firm* — Collard & Roe, P.C.; William Collard

(57) ABSTRACT

A display substrate and a display device are disclosed, and the display substrate has a plurality of sub-pixels, and includes a base substrate, a driving circuit layer, a pixel definition layer and a light-emitting device layer, and a black matrix layer. Each sub-pixel includes a pixel driving circuit in the driving circuit layer and a light-emitting device in the light-emitting device layer. The black matrix layer includes a plurality of first light-transmitting openings respectively
(Continued)

exposing the light-emitting devices of the plurality of sub-pixels in a direction perpendicular to a surface of the base substrate. The pixel definition layer includes a plurality of sub-pixel openings, at least part of the plurality of sub-pixel openings are in one-to-one correspondence with and at least partially overlapped with the plurality of first light-transmitting openings, and at least one of the plurality of first light-transmitting openings has an arc-shaped edge.

19 Claims, 17 Drawing Sheets

(51) Int. Cl.
*G06F 3/044* (2006.01)
*G06F 3/047* (2006.01)
*H10K 59/122* (2023.01)
*H10K 59/131* (2023.01)
*H10K 59/65* (2023.01)
*H10K 59/80* (2023.01)

(52) U.S. Cl.
CPC ......... *H10K 59/122* (2023.02); *H10K 59/352* (2023.02); *H10K 59/353* (2023.02); *H10K 59/873* (2023.02); *H10K 59/8792* (2023.02); *H10K 59/131* (2023.02); *H10K 59/65* (2023.02)

(56) References Cited

U.S. PATENT DOCUMENTS

| | | | |
|---|---|---|---|
| 10,853,618 B2 | 12/2020 | Ko et al. | |
| 10,943,955 B2 | 3/2021 | Wang et al. | |
| 11,271,183 B2 | 3/2022 | Zeng et al. | |
| 11,348,356 B2 | 5/2022 | Chan et al. | |
| 2011/0102308 A1 | 5/2011 | Nakamura et al. | |
| 2011/0285680 A1 | 11/2011 | Nakamura | |
| 2012/0182277 A1 | 7/2012 | Jeong et al. | |
| 2013/0002690 A1 | 1/2013 | Ichinose et al. | |
| 2013/0082909 A1* | 4/2013 | Miura | H10K 59/879 345/76 |
| 2013/0293459 A1 | 11/2013 | Nakamura et al. | |
| 2015/0109697 A1 | 4/2015 | Nagase et al. | |
| 2015/0160754 A1 | 6/2015 | Wenzel | |
| 2016/0071910 A1 | 3/2016 | Sasaki et al. | |
| 2016/0195983 A1 | 7/2016 | Miyake | |
| 2016/0276421 A1 | 9/2016 | Lee et al. | |
| 2017/0162632 A1 | 6/2017 | Kim et al. | |
| 2017/0213878 A1* | 7/2017 | Song | H10K 59/131 |
| 2017/0221196 A1 | 8/2017 | Yamaguchi et al. | |
| 2017/0277219 A1 | 9/2017 | Chung et al. | |
| 2018/0095567 A1 | 4/2018 | Lee et al. | |
| 2019/0064960 A1 | 2/2019 | Na et al. | |
| 2019/0140030 A1 | 5/2019 | Huangfu et al. | |
| 2019/0245017 A1 | 8/2019 | Jeon et al. | |
| 2019/0258338 A1 | 8/2019 | Park | |
| 2019/0326360 A1 | 10/2019 | Gwon et al. | |
| 2019/0326361 A1 | 10/2019 | Gwon et al. | |
| 2020/0013833 A1 | 1/2020 | Wang et al. | |
| 2020/0117304 A1 | 4/2020 | Lee et al. | |
| 2020/0161398 A1 | 5/2020 | Bang et al. | |
| 2020/0203453 A1 | 6/2020 | Kim et al. | |
| 2020/0343477 A1 | 10/2020 | Zeng et al. | |
| 2020/0363905 A1 | 11/2020 | Jo et al. | |
| 2021/0013268 A1 | 1/2021 | Joo et al. | |
| 2021/0149525 A1 | 5/2021 | Xu et al. | |
| 2021/0320130 A1 | 10/2021 | Xian et al. | |
| 2021/0326001 A1 | 10/2021 | Jo et al. | |
| 2021/0328199 A1* | 10/2021 | Yao | H10K 50/865 |
| 2021/0343951 A1 | 11/2021 | Ju | |
| 2021/0397806 A1* | 12/2021 | Lu | H10K 59/8792 |
| 2022/0011482 A1 | 1/2022 | Wang et al. | |
| 2022/0129131 A1 | 4/2022 | Liu et al. | |
| 2022/0137751 A1 | 5/2022 | Wang et al. | |
| 2022/0199942 A1* | 6/2022 | Li | H10K 59/38 |
| 2022/0271098 A1 | 8/2022 | Xu et al. | |
| 2022/0334678 A1 | 10/2022 | Long | |
| 2022/0392971 A1 | 12/2022 | Wang et al. | |
| 2023/0015554 A1 | 1/2023 | Zhu et al. | |
| 2023/0214040 A1 | 7/2023 | Kim et al. | |
| 2023/0363207 A1 | 11/2023 | Li et al. | |

FOREIGN PATENT DOCUMENTS

| | | |
|---|---|---|
| CN | 102722030 A | 10/2012 |
| CN | 206209239 U | 5/2017 |
| CN | 107065360 A | 8/2017 |
| CN | 107111392 A | 8/2017 |
| CN | 108288681 A | 7/2018 |
| CN | 110061042 A | 7/2019 |
| CN | 110137206 A | 8/2019 |
| CN | 110416272 A | 11/2019 |
| CN | 110534551 A | 12/2019 |
| CN | 110728267 A | 1/2020 |
| CN | 111106153 A | 5/2020 |
| CN | 111129105 A | 5/2020 |
| CN | 111162110 A | 5/2020 |
| CN | 111312792 A | 6/2020 |
| CN | 111564571 A | 8/2020 |
| CN | 111584599 A | 8/2020 |
| CN | 111599846 A | 8/2020 |
| CN | 111694189 A | 9/2020 |
| CN | 111831172 A | 10/2020 |
| CN | 112103328 A | 12/2020 |
| CN | 112186022 A | 1/2021 |
| CN | 112259584 A | 1/2021 |
| CN | 112313802 A | 2/2021 |
| CN | 112363636 A | 2/2021 |
| CN | 112420955 A | 2/2021 |
| CN | 112420956 A | 2/2021 |
| CN | 112531006 A | 3/2021 |
| CN | 112534583 A | 3/2021 |
| CN | 112654917 A | 4/2021 |
| CN | 112673477 B | 4/2021 |
| CN | 112786812 A | 5/2021 |
| CN | 112786813 A | 5/2021 |
| CN | 112786913 A | 5/2021 |
| CN | 215834530 U | 2/2022 |
| CN | 215834552 U | 2/2022 |
| EP | 2 348 388 A2 | 7/2011 |
| IN | 109144311 A | 1/2019 |
| IN | 111725264 A | 9/2020 |
| JP | 2011118330 A | 6/2011 |
| JP | 2011151652 A | 8/2011 |
| JP | 2016081257 A | 5/2016 |
| JP | 2017146812 A | 8/2017 |
| JP | 2019129221 A | 8/2019 |
| JP | 2020194158 A | 12/2020 |
| KR | 10-2019-0037391 A | 4/2019 |
| WO | 2013191082 A | 12/2013 |
| WO | 2016080046 A1 | 5/2016 |
| WO | 2019155318 A | 8/2019 |
| WO | 2019218659 A | 11/2019 |
| WO | 2020/259647 A1 | 12/2020 |

OTHER PUBLICATIONS

International Search Report in PCT/CN2021/128698 in Chinese dated Jan. 28, 2022 with English translation.
Written Opinion in PCT/CN2021/128698 in Chinese dated Jan. 28, 2022.
Chinese Office Action in Chinese Application No. 202180016551.5 dated Jan. 30, 2023 with English translation.
Extended European Search Report in European Patent Application No. 21926068.4 dated Aug. 10, 2023.
Extended European Search Report in European Patent Application No. 21922430.0 dated Aug. 7, 2023.
Written Opinion of the International Searching Authority in PCT/CN2021/128698 dated Jan. 28, 2022 in English.
Extended European Search Report in European Application No. 21940136.1 dated Nov. 30, 2023.

(56) References Cited

OTHER PUBLICATIONS

European Office Action in European Application No. 21926068.4 dated Jan. 16, 2024.
Chinese Office Action in Chinese Application No. 202110726478.2 dated Nov. 28, 2024.
Chinese Office Action in Chinese Application No. 202110726472.5 dated Dec. 20, 2024.
U.S. Office Action in U.S. Appl. No. 17/796,490 dated Apr. 25, 2025.
Japanese Office Action in Japanese Application No. 2023-525090 dated April 1, 2205 with English translation.
U.S. Office Action in U.S. Appl. No. 17/797,227 dated Jul. 11, 2025.
U.S. Office Action in U.S. Appl. No. 17/789,674 dated Jul. 1, 2025.
Korean Office Action in Korean Application No. 1020237000767 dated Jun. 20, 2025 with English translation.
Chinese Office Action in Chinese Application No. 202110726472.5 dated Jun. 30, 2025 with English translation.

\* cited by examiner

DISPLAY SUBSTRATE AND DISPLAY DEVICE

CROSS REFERENCE TO RELATED APPLICATIONS

This application is the National Stage of PCT/CN2021/128698 filed on Nov. 4, 2021, which claims priority under 35 U.S.C. § 119 to International Patent Application No. PCT/CN2021/094676, filed on May 19, 2021, and Chinese Patent Application No. 202110726472.5, filed on Jun. 29, 2021, the entire disclosure of which is incorporated herein by reference as part of the present application.

TECHNICAL FIELD

Embodiments of the present disclosure relate to a display substrate and a display device.

BACKGROUND

OLED (Organic Light Emitting Diode) display device has a series of advantages such as self-luminescence, high contrast, high definition, wide viewing angle, low power consumption, fast response speed, and low manufacturing cost, and has become one of the key development directions of the new generation of display devices, so the OLED display device has received more and more attention.

SUMMARY

At least one embodiment of the present disclosure provides a display substrate, the display substrate has a plurality of sub-pixels arranged in an array, and comprises a base substrate, a driving circuit layer on the base substrate, a pixel definition layer and a light-emitting device layer on a side of the driving circuit layer away from the base substrate, and a black matrix layer on a side of the light-emitting device layer away from the base substrate, each of the plurality of sub-pixels comprises a pixel driving circuit in the driving circuit layer and a light-emitting device in the light-emitting device layer, and the pixel driving circuit is configured to drive the light-emitting device; the pixel definition layer comprises a plurality of sub-pixel openings, the light-emitting device comprises a first electrode layer, a light-emitting material layer, and a second electrode layer that are sequentially stacked in a direction away from the base substrate, the pixel definition layer is on a side of the first electrode layer away from the base substrate, and the plurality of sub-pixel openings respectively expose first electrode layers of light-emitting devices of the plurality of sub-pixels; the black matrix layer includes a plurality of first light-transmitting openings respectively exposing the light-emitting devices of the plurality of sub-pixels in a direction perpendicular to a surface of the base substrate, and at least one of the plurality of first light-transmitting openings has an arc-shaped edge; and in the direction perpendicular to the surface of the base substrate, at least part of the plurality of sub-pixel openings are in one-to-one correspondence with and at least partially overlapped with the plurality of first light-transmitting openings.

For example, in the display substrate provided by at least one embodiment of the present disclosure, in a direction parallel to the surface of the base substrate, a plane shape of at least one of the plurality of first light-transmitting openings is elliptical, semi-elliptical, circular, semi-circular, racetrack-shaped, or semi-racetrack-shaped.

For example, in the display substrate provided by at least one embodiment of the present disclosure, in a direction parallel to the surface of the base substrate, a plane shape of at least one of the plurality of sub-pixel openings is elliptical, semi-elliptical, circular, semi-circular, racetrack-shaped, or semi-racetrack-shaped.

For example, in the display substrate provided by at least one embodiment of the present disclosure, for a sub-pixel opening and a first light-transmitting opening that are provided corresponding to each other, and in a direction parallel to the surface of the base substrate, a plane shape of the sub-pixel opening is same as a plane shape of the first light-transmitting opening.

For example, in the display substrate provided by at least one embodiment of the present disclosure, an orthographic projection of the sub-pixel opening on the base substrate is located within an orthographic projection of the first light-transmitting opening on the base substrate.

For example, in the display substrate provided by at least one embodiment of the present disclosure, a minimum distance between an edge of the orthographic projection of the sub-pixel opening on the base substrate and an edge of the orthographic projection of the first light-transmitting opening on the base substrate ranges from 1 μm to 3 μm.

For example, in the display substrate provided by at least one embodiment of the present disclosure, the first electrode layer comprises a main body portion and a connection portion, the connection portion is configured to be electrically connected to the pixel driving circuit, and at least part of the main body portion is exposed by the sub-pixel opening; and in a direction parallel to the surface of the base substrate, a plane shape of the main body portion is at least partially same as a plane shape of the sub-pixel opening.

For example, in the display substrate provided by at least one embodiment of the present disclosure, an orthographic projection of the sub-pixel opening on the base substrate is located within an orthographic projection of the main body portion on the base substrate.

For example, in the display substrate provided by at least one embodiment of the present disclosure, a minimum distance between an edge of the orthographic projection of the sub-pixel opening on the base substrate and an edge of the orthographic projection of the main body portion on the base substrate ranges from 1 μm to 5 μm.

For example, in the display substrate provided by at least one embodiment of the present disclosure, an orthographic projection of a first light-transmitting opening corresponding to the sub-pixel opening on the base substrate is located within the orthographic projection of the main body portion on the base substrate.

For example, in the display substrate provided by at least one embodiment of the present disclosure, the orthographic projection of the main body portion on the base substrate is located within an orthographic projection of a first light-transmitting opening corresponding to the sub-pixel opening on the base substrate.

For example, the display substrate provided by at least one embodiment of the present disclosure further comprises a color film layer, the color film layer comprises a plurality of color film patterns, and the plurality of color film patterns are respectively provided in the plurality of first light-transmitting openings.

For example, in the display substrate provided by at least one embodiment of the present disclosure, the black matrix layer further includes a plurality of second light-transmitting openings, and the plurality of second light-transmitting openings are respectively between the plurality of first light-transmitting openings, and the driving circuit layer comprises a plurality of light-transmitting portions; and at least part of the plurality of second light-transmitting openings are in one-to-one correspondence with at least part of the plurality of light-transmitting portions, and are configured to transmit light in a predetermined angle range with the surface of the base substrate.

For example, in the display substrate provided by at least one embodiment of the present disclosure, for a second light-transmitting opening and a light-transmitting portion that are provided corresponding to each other, and in a direction parallel to the surface of the base substrate, a plane size of the second light-transmitting opening is smaller than a plane size of the light-transmitting portion.

For example, in the display substrate provided by at least one embodiment of the present disclosure, for the second light-transmitting opening and the light-transmitting portion that are provided corresponding to each other, an orthographic projection of the second light-transmitting opening on the base substrate at least partially overlaps with an orthographic projection of the light-transmitting portion on the base substrate.

For example, in the display substrate provided by at least one embodiment of the present disclosure, the plurality of sub-pixels comprise a red sub-pixel, a green sub-pixel, and a blue sub-pixel; a first light-transmitting opening exposing a light-emitting device of the red sub-pixel is substantially in a shape of a first ellipse; a first light-transmitting opening exposing a light-emitting device of the green sub-pixel is substantially in a shape of a second ellipse, a length of a long axis of the second ellipse is smaller than a length of a long axis of the first ellipse, and a length of a short axis of the second ellipse is smaller than a length of a short axis of the first ellipse; or, the first light-transmitting opening exposing the light-emitting device of the green sub-pixel is substantially in a shape of a semi-ellipse; and a first light-transmitting opening exposing a light-emitting device of the blue sub-pixel is substantially in a shape of a third ellipse, a length of a long axis of the third ellipse is smaller than the length of the long axis of the first ellipse, and a length of a short axis of the third ellipse is greater than the length of the short axis of the first ellipse.

For example, in the display substrate provided by at least one embodiment of the present disclosure, the first light-transmitting opening exposing the light-emitting device of the red sub-pixel comprises a first arc-shaped edge and a second arc-shaped edge opposite to each other, and a first tip and a second tip at intersections of the first arc-shaped edge and the second arc-shaped edge, and the first tip and the second tip are opposite to each other; the first light-transmitting opening exposing the light-emitting device of the blue sub-pixel comprises a third arc-shaped edge and a fourth arc-shaped edge opposite to each other, and a third tip and a fourth tip at intersections of the third arc-shaped edge and the fourth arc-shaped edge, and the third tip and the fourth tip are opposite to each other; and the first light-transmitting opening exposing the light-emitting device of the green sub-pixel comprises a fifth arc-shaped edge and a fifth tip at an end of the fifth arc-shaped edge.

For example, in the display substrate provided by at least one embodiment of the present disclosure, the sub-pixel opening corresponding to the green sub-pixel comprises a sixth arc-shaped edge and a sixth tip at an end of the sixth arc-shaped edge, a main body portion of a first electrode layer of a light-emitting device of the green sub-pixel comprises a seventh arc-shaped edge, and the seventh arc-shaped edge does not comprise a tip.

For example, in the display substrate provided by at least one embodiment of the present disclosure, the plurality of sub-pixels comprise a red sub-pixel, a green sub-pixel, and a blue sub-pixel; a first light-transmitting opening exposing a light-emitting device of the red sub-pixel is substantially in a shape of a first racetrack; a first light-transmitting opening exposing a light-emitting device of the green sub-pixel is substantially in a shape of a second racetrack, a length of a long axis of the second racetrack is smaller than a length of a long axis of the first racetrack, and a length of a short axis of the second racetrack is smaller than a length of a short axis of the first racetrack; or, the first light-transmitting opening exposing the light-emitting device of the green sub-pixel is substantially in a shape of a semi-racetrack; and a first light-transmitting opening exposing a light-emitting device of the blue sub-pixel is substantially in a shape of a third racetrack, a length of a long axis of the third racetrack is smaller than the length of the long axis of the first racetrack, and a length of a short axis of the third racetrack is greater than the length of the short axis of the first racetrack.

For example, in the display substrate provided by at least one embodiment of the present disclosure, one red sub-pixel, two green sub-pixels, and one blue sub-pixel form one pixel unit, and a plurality of pixel units formed of the plurality of sub-pixels are arranged in an array on the base substrate.

At least one embodiment of the present disclosure further provides a display device, the display device comprises the display substrate provided by the embodiments of the present disclosure.

For example, display device provided by at least one embodiment of the present disclosure further comprises a texture touch surface and an image sensor array, the image sensor array is on a side of the driving circuit layer away from the light-emitting device layer, and comprises a plurality of image sensors, and the plurality of image sensors are configured to receive light, emitted from a plurality of light-emitting devices in the light-emitting device layer, reflected by a texture on the texture touch surface, and reaching the plurality of image sensors, for texture collection.

BRIEF DESCRIPTION OF THE DRAWINGS

In order to clearly illustrate the technical solution of the embodiments of the present disclosure, the drawings of the embodiments will be briefly described. It is obvious that the described drawings in the following are only related to some embodiments of the present disclosure and thus are not limitative of the present disclosure.

DETAILED DESCRIPTION

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," and similar terms are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The terms "connect", "connected", etc., are not intended to define a physical connection or mechanical connection, but may include an electrical connection, directly or indirectly. "On," "under," "left," "right" and the like are only used to indicate relative position relationship, and when the position of the object which is described is changed, the relative position relationship may be changed accordingly.

In order to prevent the screen from reflecting light, in the traditional OLED display substrate, a layer of polarizer is usually attached on the display substrate to improve the use comfort of the display substrate under ambient light. However, the inventor(s) of the present disclosure found that the transmittance of the polarizer is usually only about 40%, resulting in a low light extraction rate of the display substrate, which in turn leads to higher power consumption of the display substrate.

In some embodiments, COE (Cover film On Encapsulation) technology, that is, a technology that uses a color film (CF) to replace the polarizer, can be used to improve the light extraction rate of the display substrate, and this technology is beneficial to the development of the display substrate in the direction of high integration and thinness.

Figure 1:
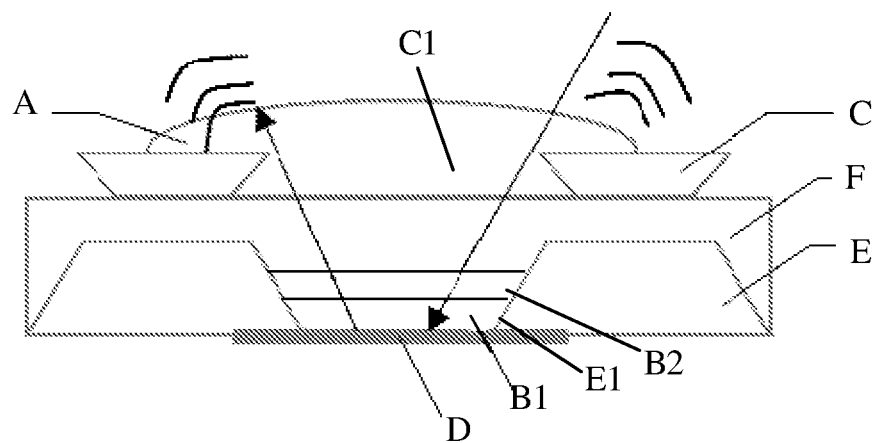
FIG. 1 is a schematic partial cross-sectional view of a display substrate.

For example, FIG. 1 shows a schematic partial cross-sectional view of an exemplary display substrate using COE technology. As shown in FIG. 1, the display substrate has structures such as a pixel definition layer E, a light-emitting device, a black matrix layer C, and an encapsulation layer F. The pixel definition layer E has a sub-pixel opening E1, the sub-pixel opening E1 exposes an anode D of the light-emitting device, and a light-emitting layer B1 and a cathode B2 of the light-emitting device are formed in the sub-pixel opening E1 and on the anode D. Within the range defined by the sub-pixel opening E1, the light-emitting layer B1 is in contact with the anode D, and the light-emitting layer B1 can be jointly driven by the anode D and the cathode B2 to emit light. Thus, the region defined by the sub-pixel opening E1 is an effective light-emitting region of the sub-pixel. The encapsulation layer F is provided on the light-emitting device, the black matrix layer C is provided on the encapsulation layer F, and the black matrix layer C has a sub-pixel light-exiting opening C1, which is used to expose the effective light-emitting region of the sub-pixel, so that the light emitted by the light-emitting device of the sub-pixel can be emitted out. For example, a color film A is formed in the sub-pixel light-exiting opening C1, and the color of the color film A is the same as the color of the light emitted by the light-emitting layer of the light-emitting device, thereby improving the light-exiting purity of the display substrate and improving the light extraction rate of the display substrate. Alternatively, the light-emitting layer of the light-emitting device emits white light, and after adding the color film A, monochromatic light can be formed.

However, the inventor(s) of the present disclosure found that, as shown in FIG. 1, the external light (as shown by the arrow in FIG. 1) will be diffracted through the edge of the sub-pixel light-exiting opening C1, and part light of the external light reflected by the anode and cathode of the light-emitting device will also be diffracted through the edge of the sub-pixel light-exiting opening C1, resulting in the color separation phenomenon of the display substrate, that is, the phenomenon in which the external light and the part light of external light reflected by the anode and the cathode of the light-emitting device generate color at the edge of the sub-pixel light-exiting opening C1. Through research, it is found that the diffracted light range (the shape of the diffracted light) generated by the above-mentioned diffraction phenomenon is related to the shape and size of the sub-pixel light-exiting opening C1.

Figure 2:
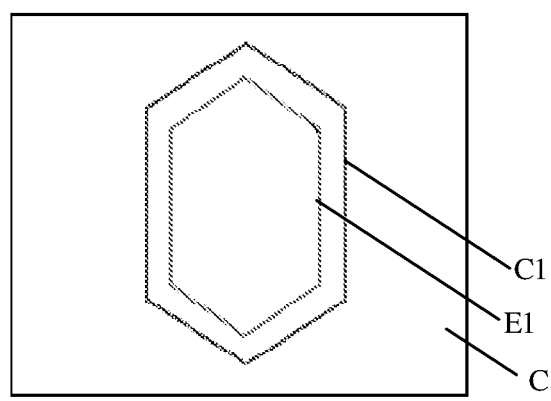
FIG. 2 is a schematic plan view of a sub-pixel opening of a pixel definition layer and a sub-pixel light-exiting opening of a black matrix layer of a display substrate.

For example, FIG. 2 shows a schematic plan view of a sub-pixel opening of a pixel definition layer and a sub-pixel light-exiting opening of a black matrix layer corresponding to one sub-pixel of an exemplary display substrate. As shown in FIG. 2, the plane shape of the region defined by the sub-pixel opening E1 of the pixel definition layer E is hexagonal, and correspondingly, the plane shape of the region defined by the sub-pixel light-exiting opening C1 of the black matrix layer C is also hexagonal. Because the sub-pixel light-exiting opening C1 of the black matrix layer C in the display substrate using COE technology is small, for example, in the order of $\lambda*10^2$, in the current sub-pixel arrangement, for example, in the sub-pixel arrangement with red sub-pixels, green sub-pixels and blue sub-pixels, at the hexagonal sub-pixel light-exiting opening C1, the display substrate will inevitably generate the diffraction effect of monochromatic light (red, green and blue, etc.) under external light (such as a point light source). In addition, because the light-emitting efficiencies of the light-emitting devices of different color sub-pixels are different, the shapes and sizes of the sub-pixel openings E1 of the pixel definition layer E corresponding to the different color sub-pixels are usually different, in which the diffraction phenomena generated by sub-pixels with narrower opening size and sub-pixels with shorter opening size are more serious, and these diffraction phenomena further aggravate the degree of color separation phenomenon.

It should be noted that, in the embodiments of the present disclosure, the color separation phenomenon refers to the phenomenon that the reflected light presents a separation of colors (e.g., red, green, and blue) under external light (e.g., point light source, or line light source) when the display substrate is in the off-screen state.

At least one embodiment of the present disclosure provides a display substrate and a display device. The display substrate has a plurality of sub-pixels arranged in an array, and includes a base substrate, a driving circuit layer on the base substrate, a pixel definition layer and a light-emitting device layer on a side of the driving circuit layer away from the base substrate, and a black matrix layer on a side of the light-emitting device layer away from the base substrate. Each of the plurality of sub-pixels includes a pixel driving circuit in the driving circuit layer and a light-emitting device in the light-emitting device layer, and the pixel driving circuit is configured to drive the light-emitting device. The pixel definition layer includes a plurality of sub-pixel openings, the light-emitting device includes a first electrode layer, a light-emitting material layer, and a second electrode layer that are sequentially stacked in a direction away from the base substrate, the pixel definition layer is on a side of the first electrode layer away from the base substrate, and the plurality of sub-pixel openings respectively expose first electrode layers of the light-emitting devices of the plurality of sub-pixels. The black matrix layer includes a plurality of first light-transmitting openings respectively exposing the light-emitting devices of the plurality of sub-pixels in a direction perpendicular to a surface of the base substrate, and at least one of the plurality of first light-transmitting openings has an arc-shaped edge. In the direction perpendicular to the surface of the base substrate, at least part of the plurality of sub-pixel openings are in one-to-one correspondence with and at least partially overlapped with the plurality of first light-transmitting openings.

In the above-mentioned display substrate provided by at least one embodiment of the present disclosure, at least one of the plurality of first light-transmitting openings has an arc-shaped edge, and the arc-shaped edge can reduce or even eliminate the phenomenon that the external light is diffracted at the edge of the first light-transmitting opening of the black matrix layer to cause color separation of the display substrate, thereby improving the display effect of the display substrate.

Hereinafter, the display substrate and the display device provided by the embodiments of the present disclosure will be described in detail through several specific embodiments.

Figure 3:
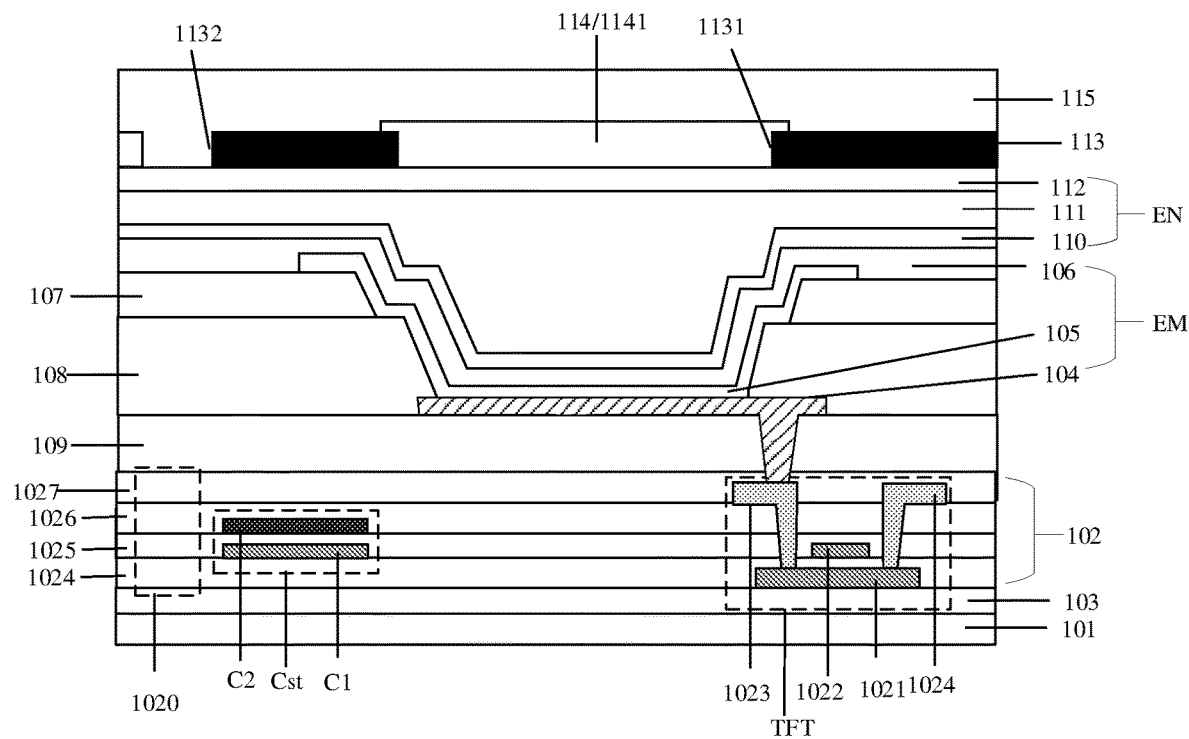
FIG. 3 is a schematic partial cross-sectional view of a display substrate provided by at least one embodiment of the present disclosure.

FIG. 3 shows a schematic cross-sectional view of a display substrate provided by at least one embodiment of the present disclosure. As shown in FIG. 3, the display substrate has a plurality of sub-pixels arranged in an array, and FIG. 3 shows one sub-pixel as an example. The display substrate includes a base substrate 101, a driving circuit layer 102 provided on the base substrate 101, a light-emitting device layer provided on a side of the driving circuit layer 102 away from the base substrate 101, and a black matrix layer 113 provided on a side of the light-emitting device layer away from the base substrate 101.

Figure 4A:
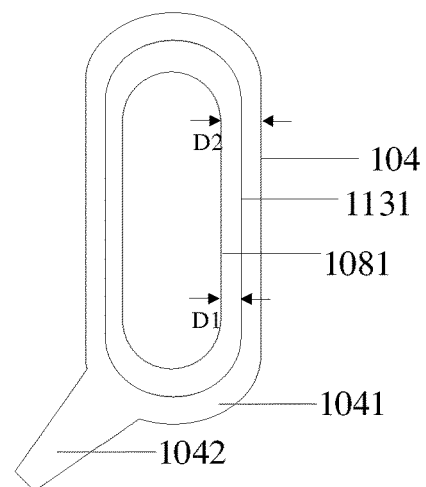
FIG. 4A is a schematic plan view of a sub-pixel opening of a pixel definition layer, a first light-transmitting opening of a black matrix layer, and a first electrode layer of a light-emitting device of a display substrate provided by at least one embodiment of the present disclosure.

As shown in FIG. 3, each sub-pixel includes a pixel driving circuit provided in the driving circuit layer 102 and a light-emitting device EM provided in the light-emitting device layer, and the pixel driving circuit is configured to drive the light-emitting device EM. The black matrix layer 113 includes a plurality of first light-transmitting openings 1131 respectively exposing the light-emitting devices EM of the plurality of sub-pixels in a direction (i.e., in the vertical direction in the figure) perpendicular to the surface of the base substrate 101, so as to respectively transmit light emitted by the light-emitting devices EM of the plurality of sub-pixels. For example, FIG. 4A shows a schematic plan view of the first light-transmitting opening 1131, that is, a schematic plan view in a direction parallel to the surface of the base substrate 101. As shown in FIG. 4A, at least one first light-transmitting opening 1131 has an arc-shaped edge, for example, each first light-transmitting opening 1131 has an arc-shaped edge.

For example, in some embodiments, as shown in FIG. 4A, in the direction parallel to the surface of the base substrate 101, the plane shape of at least one (e.g., each) of the plurality of first light-transmitting openings 1131 is substantially elliptical (or mango-shaped), semi-elliptical, circular, semi-circular, racetrack-shaped (the case shown in the figure), semi-racetrack-shaped, or a deformed shape thereof.

It should be noted that, in the embodiments of the present disclosure, the racetrack shape refers to a racetrack-like shape formed by a rectangle and two arcs on opposite sides of the rectangle, and the racetrack shape has two straight sides arranged parallel to each other and two circular arcs arranged opposite to each other. The mango shape may be regarded as a deformed shape of an ellipse with two arc edges arranged opposite to each other. For details, please refer to FIG. 6 and FIG. 7 described later.

For example, as shown in FIG. 3, the pixel driving circuit of each sub-pixel includes at least one thin film transistor TFT and a storage capacitor Cst. The thin film transistor TFT includes an active layer 1021, a gate electrode 1022, a source electrode 1023, a drain electrode 1024, and the like. The source electrode 1023 of the thin film transistor TFT is electrically connected to the first electrode layer 104 of the light-emitting device EM. For example, the storage capacitor Cst includes a first capacitor electrode C1 and a second capacitor electrode C2. For example, the first capacitor electrode C1 of the storage capacitor Cst is provided in the same layer as the gate electrode 1022 of the thin film transistor TFT.

For example, the pixel driving circuit is formed into a 2T1C (two thin film transistors and one storage capacitor) structure, a 6T1C (six thin film transistors and one storage capacitor) structure, or the like, and therefore include a plurality of thin film transistors, and the plurality of thin film transistors have a stacked structure similar or identical to that of the thin film transistor shown in FIG. 3. FIG. 3 only shows the thin film transistor directly connected to the light-emitting device, and the thin film transistor may be a driving thin film transistor, a light-emitting control thin film transistor, or the like.

In addition, it should be noted that, in the embodiments of the present disclosure, "provided in the same layer" means that two functional layers or structural layers are formed in the same layer and with the same material in the hierarchical structure of the display substrate, that is, during the manufacturing process, the two functional layers or structural layers are formed by the same material layer, and the required patterns and structures are formed by the same patterning process.

In addition, as shown in FIG. 3, the display panel further includes a buffer layer 103 provided on the base substrate 101, a first gate insulating layer 1024 provided on the active layer 1021, a second gate insulating layer 1025 provided on the gate electrode 1022 and the first capacitor electrode C1, an interlayer insulating layer 1026 provided on the second capacitor electrode CE2, a passivation layer 1027 provided on the source electrode 1023 and the drain electrode 1024, a planarization layer 109 provided on the passivation layer 1027, and the like.

For example, in some embodiments, as shown in FIG. 3, the display substrate further includes a pixel definition layer 108 provided on the side of the driving circuit layer 102 away from the base substrate 101, for example, the pixel definition layer 108 is provided on the planarization layer 109, and the pixel definition layer 108 includes a plurality of sub-pixel openings 1081. The light-emitting device EM includes a first electrode layer 104, a light-emitting material layer 105, and a second electrode layer 106 that are sequentially stacked in a direction away from the base substrate 101, the pixel definition layer 108 is provided on a side of the first electrode layer 104 away from the base substrate 101, and the plurality of sub-pixel openings 1081 respectively expose the first electrode layers 104 of the light-emitting devices EM of the plurality of sub-pixels. In the direction perpendicular to the surface of the base substrate 101, that is, in the vertical direction in the figure, the plurality of sub-pixel openings 1081 are in one-to-one correspondence with and at least partially overlapped with the plurality of first light-transmitting openings 1131. Thus, the light emitted by the light-emitting device EM can be emitted out from the first light-transmitting opening 1131 to achieve the display effect.

For example, in some embodiments, as shown in FIG. 4A, in the direction parallel to the surface of the base substrate 101, the plane shape of the at least one sub-pixel opening 1081 is substantially elliptical (or mango-shaped), semi-elliptical, circular, semi-circular, racetrack-shaped (the case shown in the figure), semi-racetrack-shaped, or a deformed shape thereof.

For example, in some embodiments, as shown in FIG. 4A, for a sub-pixel opening 1081 and a first light-transmitting opening 1131 that are provided corresponding to each other, and in the direction parallel to the surface of the base substrate 101, the plane shape of the sub-pixel opening 1081 is the same as the plane shape of the first light-transmitting opening 1131, and both are shown in the figure as a racetrack shape.

For example, in some embodiments, as shown in FIG. 4A, the orthographic projection of the sub-pixel opening 1081 on the base substrate 101 is located within the orthographic projection of the first light-transmitting opening 1131 on the base substrate 101; that is, the plane size of the sub-pixel opening 1081 is smaller than the plane size of the first light-transmitting opening 1131.

Because the light-emitting material layer 105 is in contact with the first electrode layer 104 within the range defined by the sub-pixel opening 1081, the light-emitting material layer 105 can be jointly driven by the first electrode layer 104 and the second electrode layer 106 to emit light. Thus, the region defined by the sub-pixel opening 1081 is the effective light-emitting region of the sub-pixel. By designing the plane shape of the sub-pixel opening 1081 to be substantially the same as the plane shape of the first light-transmitting opening 1131, and the plane size of the sub-pixel opening 1081 is smaller than the plane size of the first light-transmitting opening 1131, the effective light-emitting region of the sub-pixel is sufficiently exposed by the first light-transmitting opening 1131, and the light emitted by the light-emitting device of the sub-pixel can be sufficiently emitted out from the first light-transmitting opening 1131. Thus, the display substrate can fully utilize the light emitted by the light-emitting devices of the sub-pixels for display, thereby improving the light extraction rate of the display substrate and saving power consumption.

For example, in some embodiments, as shown in FIG. 4A, the minimum distance D1 between an edge of the orthographic projection of the sub-pixel opening 1081 on the base substrate 101 and an edge of the orthographic projection of the first light-transmitting opening 1131 on the base substrate 101 ranges from 1 μm to 3 μm, such as 1.5 μm, 2 μm, or 2.5 μm, etc. That is, the sub-pixel opening 1081 is shrunk inward by 1 μm-3 μm relative to the first light-transmitting opening 1131, so that the effective light-emitting region defined by the sub-pixel opening 1081 is sufficiently exposed by the first light-transmitting opening 1131.

For example, in some embodiments, as shown in FIG. 3 and FIG. 4A, the first electrode layer 104 includes a main body portion 1041 and a connection portion 1042, the connection portion 1042 is configured to be electrically connected to the pixel driving circuit, and at least part of the main body portion 1041 is exposed by the sub-pixel opening 1081. For example, in the direction parallel to the surface of the base substrate 101, the plane shape of the main body portion 1041 is the same as the plane shape of the sub-pixel opening 1081.

For example, in some embodiments, as shown in FIG. 4A, the orthographic projection of the sub-pixel opening 1081 on the base substrate 101 is located within the orthographic projection of the main body portion 1041 on the base substrate 101. Thus, the shape and size of the main body portion 1041 exposed by the sub-pixel opening 1081 are the same as the shape and size of the sub-pixel opening 1081.

Therefore, during the manufacturing process, the effective light-emitting area of each sub-pixel can be obtained by designing the size of the sub-pixel opening 1081. In addition, the larger size of the main body portion 1041 also provides a margin for the possible positional deviation of the sub-pixel opening 1081 during the manufacturing process.

For example, in some embodiments, as shown in FIG. 4A, the minimum distance D2 between an edge of the orthographic projection of the sub-pixel opening 1081 on the base substrate 101 and an edge of the orthographic projection of the main body portion 1041 on the base substrate 101 ranges from 1 µm to 5 µm, such as 2.5 µm, 3 µm, or 3.5 µm, etc. That is, the sub-pixel opening 1081 is shrunk inward by 1 µm-5 µm relative to the main body portion 1041.

For example, in some embodiments, as shown in FIG. 4A, the orthographic projection of the first light-transmitting opening 1131 corresponding to the sub-pixel opening 1081 on the base substrate 101 is located within the orthographic projection of the main body portion 1041 on the base substrate 101, that is, in the direction parallel to the surface of the base substrate 101, the plane sizes of the main body portion 1041, the first light-transmitting opening 1131, and the sub-pixel opening 1081 gradually decrease. The design is beneficial to improve the production yield of the display substrate, improve the light extraction rate of the display substrate, and reduce or even eliminate the phenomenon of color separation of the display substrate.

Figure 4B:
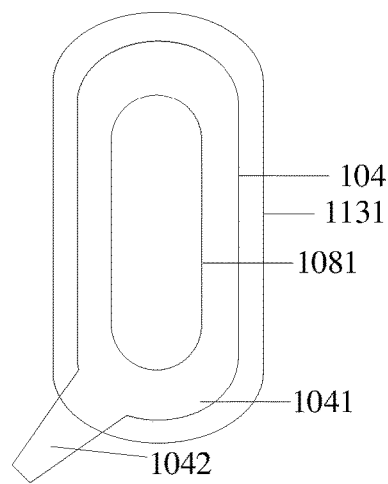
FIG. 4B is another schematic plan view of a sub-pixel opening of a pixel definition layer, a first light-transmitting opening of a black matrix layer, and a first electrode layer of a light-emitting device of a display substrate provided by at least one embodiment of the present disclosure.

For example, in other embodiments, as shown in FIG. 4B, the orthographic projection of the main body portion 1041 on the base substrate 101 is located within the orthographic projection of the first light-transmitting opening 1131 corresponding to the sub-pixel opening 1081 on the base substrate 101. In this case, the shapes of the first light-transmitting opening 1131 and the main body portion 1041 are basically the same, and the first light-transmitting opening 1131 expands outward relative to the main body portion 1041. This solution can also improve the light extraction rate of the display substrate and reduce or even eliminate the phenomenon of color separation of the display substrate.

For example, in some embodiments, as shown in FIG. 3, the display substrate further includes other structures such as a spacer 107 provided on the pixel definition layer 108 and an encapsulation layer EN provided on the light-emitting device EM of the sub-pixel. For example, the encapsulation layer EN includes a plurality of sub-encapsulation layers to improve its encapsulation effect. For example, the encapsulation layer EN is a composite encapsulation layer, including a first inorganic encapsulation layer 110, a second organic encapsulation layer 111, and a third inorganic encapsulation layer 112. For example, the first inorganic encapsulation layer 110 and the third inorganic encapsulation layer 112 are formed of an inorganic material such as silicon nitride, silicon oxide, silicon oxynitride, or the like, and the second organic encapsulation layer 111 is formed of an organic material such as polyimide (PI), epoxy resin, or the like. The composite encapsulation layer can form multiple protections for the functional structures on the display substrate, and has a better encapsulation effect.

Figure 5:
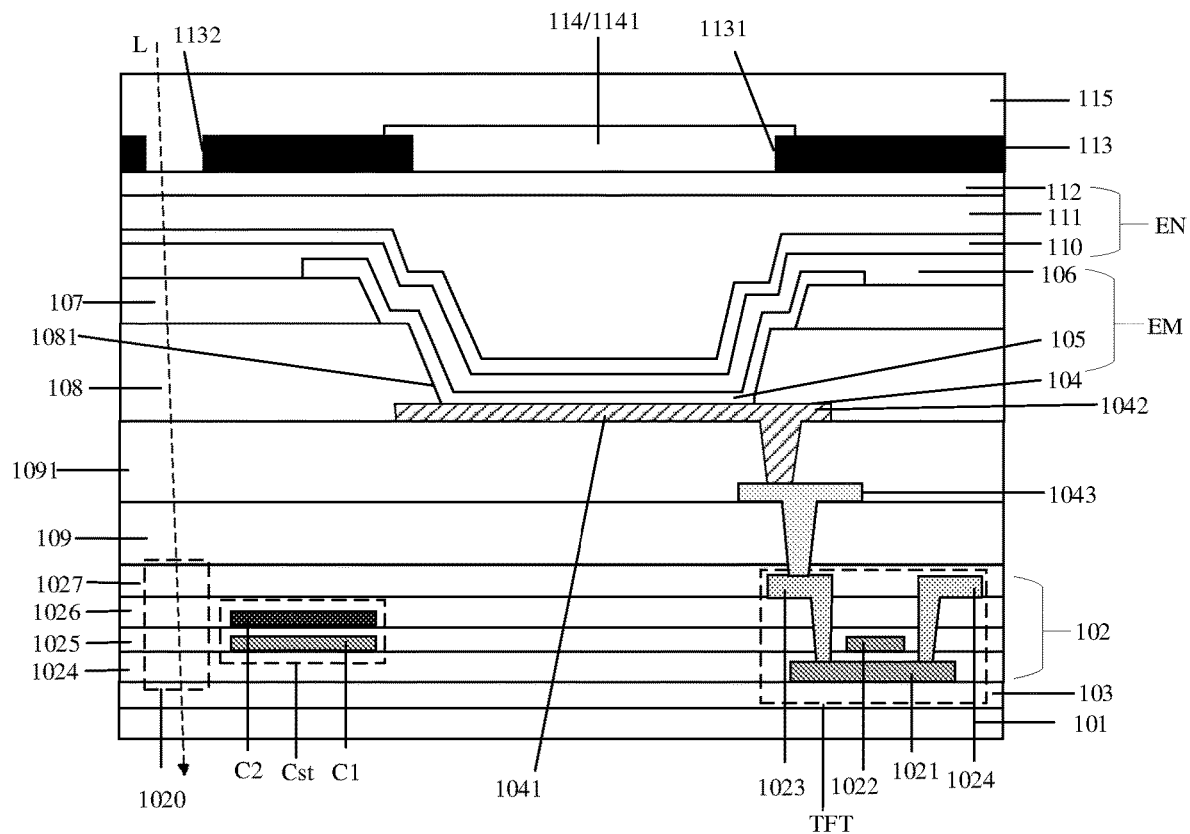
FIG. 5 is another schematic partial cross-sectional view of a display substrate provided by at least one embodiment of the present disclosure.

For example, in other embodiments, as shown in FIG. 5, the display substrate further includes a connection electrode 1043, the first electrode layer 104 of the light-emitting device EM of the sub-pixel is electrically connected to the source electrode 1023 of the thin film transistor TFT through the connection electrode 1043. For example, another planarization layer 1091 is further formed on the connection electrode 1043, and in this case, the pixel definition layer 108 is provided on the planarization layer 1091. For other structures of the display substrate shown in FIG. 5, references may be made to the description of the display substrate shown in FIG. 3 and FIG. 4A, which will not be repeated here.

For example, in the embodiments of the present disclosure, the base substrate 101 includes a flexible insulating material such as polyimide (PI) or a rigid insulating material such as a glass substrate. For example, in some examples, the base substrate 101 is a stacked structure in which a plurality of flexible layers and a plurality of barrier layers are alternately arranged. In this case, the flexible layer may include polyimide, and the barrier layer may include an inorganic insulating material such as silicon oxide, silicon nitride, silicon oxynitride, or the like. For example, the buffer layer 103 may include an inorganic material such as silicon nitride, silicon oxide, silicon oxynitride, or the like. The active layer 1021 is made of a material such as polysilicon, metal oxide, or the like, and the first gate insulating layer 1024 and the second gate insulating layer 1025 are made of an inorganic insulating material such as silicon oxide, silicon nitride, silicon oxynitride, or the like. The gate electrode 1022 and the first capacitor electrode C1 are made of a metal material such as copper, aluminum, titanium, cobalt, or the like, for example, they are formed into a single-layer structure or a multi-layer structure, for example a multi-layer structure such as titanium/aluminum/titanium, molybdenum/aluminum/molybdenum, or the like. The second capacitor electrode C2 is made of a metal such as copper, aluminum, titanium, cobalt, or the like, or an alloy material; the interlayer insulating layer 1026 is made of an inorganic insulating material such as silicon oxide, silicon nitride, silicon oxynitride, or the like; and the passivation layer 1027 is made of an inorganic insulating material such as silicon oxide, silicon nitride, silicon oxynitride, or the like. For example, in some embodiments, the display substrate may also have no passivation layer as shown in FIG. 3 and FIG. 5. The source and drain electrodes 1023 and 1024 are made of a metal material such as copper, aluminum, titanium, cobalt, or the like, for example, are formed into a single-layer structure or a multi-layer structure, for example a multi-layer structure such as titanium/aluminum/titanium, molybdenum/aluminum/molybdenum, or the like. The first electrode layer 104 is, for example, an anode layer, including a metal oxide such as ITO, IZO, or the like, or a metal such as Ag, Al, Mo, or the like, or their alloys. The material of the light-emitting material layer 105 is an organic light-emitting material. For example, the material of the light-emitting material layer 105 is selected as a light-emitting material that can emit light of a certain color (e.g., red light, blue light, green light, etc.) according to requirements. The second electrode layer 106 is, for example, a cathode layer, including a metal such as Mg, Ca, Li, Al, or the like, or their alloys, or a metal oxide such as IZO, ZTO, or the like, or an organic material with conductive properties such as PEDOT/PSS (poly3, 4-ethylenedioxythiophene/polystyrene sulfonate), or the like. The planarization layer 109 (and the planarization layer 1091), the pixel definition layer 108, and the spacer 107 are made of an organic insulating material such as polyimide or the like. The embodiments of the present disclosure do not specifically limit the material of each functional layer.

For example, in some embodiments, as shown in FIG. 3, the display substrate further includes a color film layer 114, the color film layer 114 includes a plurality of color film patterns 1141, and the plurality of color film patterns 1141 are respectively provided in the plurality of first light-transmitting openings 1131. Therefore, the light emitted by the light-emitting device EM of the sub-pixel can be emitted out through the color film pattern 1141 to improve the purity of the emitted light.

For example, as shown in FIG. 3, the display substrate further includes a protective cover plate 115 provided on the black matrix layer 113 and the color film layer 114 to protect the structure of the display substrate. For example, the protective cover plate 115 may be a glass cover plate, which can be bonded to the display substrate by optically transparent glue (not shown in the figure).

For example, in some embodiments, as shown in FIG. 3, the black matrix layer 113 may further include a plurality of second light-transmitting openings 1132, the plurality of second light-transmitting openings 1132 are respectively arranged between the plurality of first light-transmitting openings 1131, and the driving circuit layer includes a plurality of light-transmitting portions 1020; at least part of the second light-transmitting openings 1132 are provided in one-to-one correspondence with at least part of the plurality of light-transmitting portions 1020, and are configured to transmit light which is in a predetermined angle range with the surface of the base substrate 101, for example, transmit the light L shown in the figure. Thus, the light L can pass through the display substrate from a display side (the upper side in the figure) to a non-display side (the lower side in the figure) of the display substrate, so as to be used for a photosensitive device (such as an image sensor, etc.) that may be provided on the non-display side of the display substrate for photosensitive operation.

For example, the plurality of light-transmitting portions 1020 include a light-transmitting insulating material, and the light-transmitting insulating material includes the light-transmitting insulating material of an insulating layer such as the first gate insulating layer 1024, the second gate insulating layer 1025, the interlayer insulating layer 1026, the passivation layer 1027, or the like.

For example, in some embodiments, for a second light-transmitting opening 1132 and a light-transmitting portion 1020 that are provided corresponding to each other, and in the direction parallel to the surface of the base substrate, the plane size of the second light-transmitting opening 1132 is smaller than the plane size of the light-transmitting portion 1020, which will be described in detail later.

For example, in some embodiments, for the second light-transmitting opening 1132 and the light-transmitting portion 1020 that are provided corresponding to each other, the orthographic projection of the second light-transmitting opening 1132 on the base substrate 101 at least partially overlaps with the orthographic projection of the light-transmitting portion 1020 on the base substrate 101, which will be described in detail later.

Figure 6:
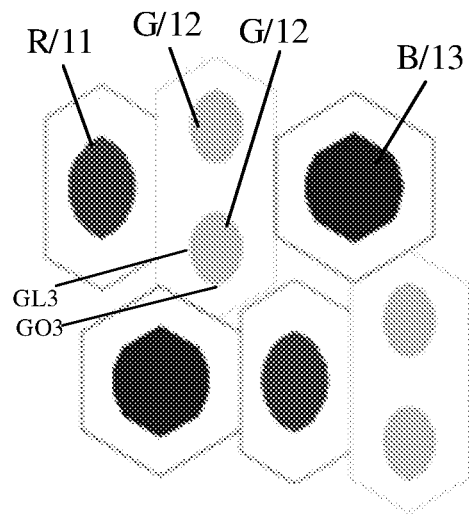
FIG. 6 is a plan layout diagram of a plurality of sub-pixels of a display substrate provided by at least one embodiment of the present disclosure.

For example, in some embodiments, as shown in FIG. 6, the plurality of sub-pixels of the display substrate include a red sub-pixels R, a green sub-pixel G, and a blue sub-pixel B, the pixel definition layer includes a red sub-pixel opening 11, a green sub-pixel opening 12, and a blue sub-pixel opening 13, and the light-emitting devices EM of the red sub-pixel R, the green sub-pixel G and the blue sub-pixel B are respectively formed in the red sub-pixel opening 11, the green sub-pixel opening 12 and the blue sub-pixel opening 13 of the pixel definition layer.

Figure 7:
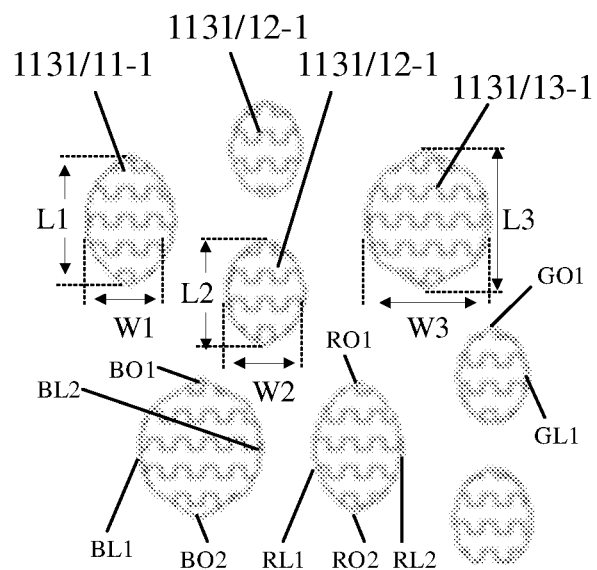
FIG. 7 is a plan layout diagram of a plurality of first light-transmitting openings of a black matrix layer corresponding to a plurality of sub-pixels of the display substrate shown in FIG. 6.

For example, FIG. 7 shows the plurality of first light-transmitting openings 1131 of the black matrix layer 113 corresponding to the plurality of sub-pixels in FIG. 6. As shown in FIG. 7, the first light-transmitting opening 1131 exposing the light-emitting device EM of the red sub-pixel R is substantially in a shape of a first ellipse 11-1 (or called the mango shape, formed by two symmetrical circular arcs), the first light-transmitting opening 1131 exposing the light-emitting device EM of the green sub-pixel G is substantially in a shape of a second ellipse 12-1 (or called the mango shape), the length L2 of the long axis of the second ellipse 12-1 is smaller than the length L1 of the long axis of the first ellipse 11-1, and the length W2 of the short axis of the second ellipse 12-1 is smaller than the length W1 of the short axis of the first ellipse 11-1. The first light-transmitting opening 1131 exposing the light-emitting device of the blue sub-pixel B is substantially in a shape of a third ellipse 13-1, the length L3 of the long axis of the third ellipse 13-1 is smaller than the length L1 of the long axis of the first ellipse 11-1, and the length W3 of the short axis of the third ellipse 13-1 is greater than the length L1 of the short axis of the first ellipse 11-1.

For example, as shown in FIG. 6 and FIG. 7, the shape of the first light-transmitting opening 1131 exposing the light-emitting device EM of the red sub-pixel R is the same as the shape of the red sub-pixel opening 11 of the pixel definition layer corresponding to the red sub-pixel R, and the plane size of the red sub-pixel opening 11 is smaller than the plane size of the first light-transmitting opening 1131 exposing the light-emitting device EM of the red sub-pixel R. The shape of the first light-transmitting opening 1131 exposing the light-emitting device EM of the green sub-pixel G is the same as the shape of the green sub-pixel opening 12 of the pixel definition layer corresponding to the green sub-pixel G, and the plane size of the green sub-pixel opening 12 is smaller than the plane size of the first light-transmitting opening 1131 exposing the light-emitting device EM of the green sub-pixel G. The shape of the first light-transmitting opening 1131 exposing the light-emitting device EM of the blue sub-pixel B is the same as the shape of the blue sub-pixel opening 13 of the pixel definition layer corresponding to the blue sub-pixel B, and the plane size of the blue sub-pixel opening 13 is smaller than the plane size of the first light-transmitting opening 1131 exposing the light-emitting device EM of the blue sub-pixel B.

By performing Lab color space detection on the above-mentioned display substrate including the sub-pixel with the shape of an ellipse (or mango shape), for example, using a color analyzer to detect the display substrate in a dark state, it is concluded that the Lab value is 7.68, while the Lab value of the display substrate including the hexagonal sub-pixel (as shown in FIG. 2) is 28.3. The lower the Lab value, the less the phenomenon of color separation on the display substrate. Therefore, the display substrate provided by the embodiments of the present disclosure significantly reduces the degree of color separation of the display substrate.

Figure 8A:
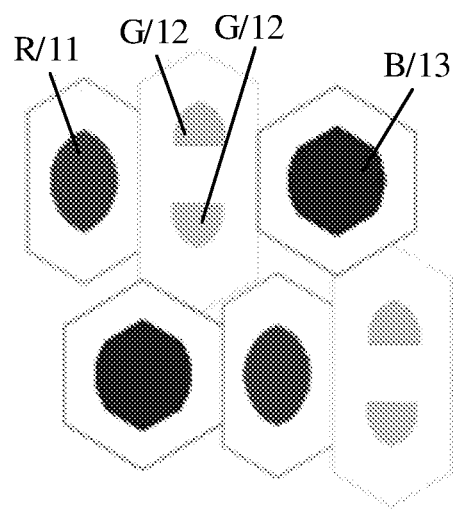
FIG. 8A is another plan layout diagram of a plurality of sub-pixels of a display substrate provided by at least one embodiment of the present disclosure.
Figure 8B:
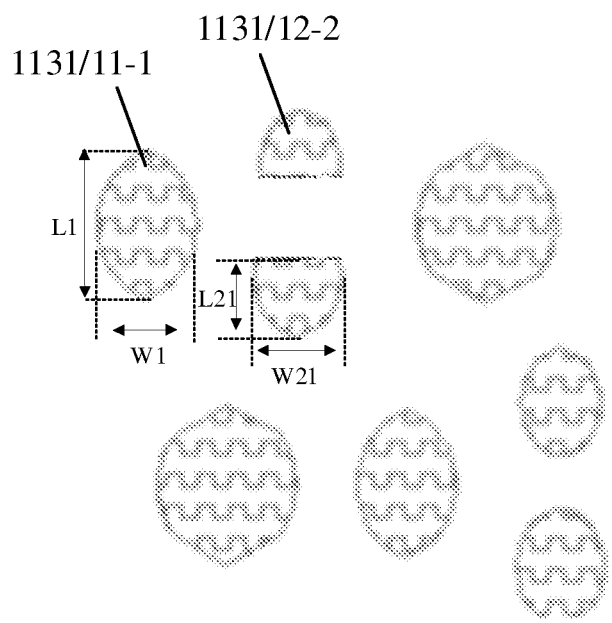
FIG. 8B is a plan layout diagram of a plurality of first light-transmitting openings of a black matrix layer corresponding to a plurality of sub-pixels of the display substrate shown in FIG. 8A.

For example, in other examples, as shown in FIG. 8A and FIG. 8B, the green sub-pixel opening 12 of the pixel definition layer corresponding to the green sub-pixel G is substantially in a shape of a semi-ellipse, the first light-transmitting opening 1311 exposing the light-emitting device of the green sub-pixel G is also substantially in a shape of a semi-ellipse 12-2, that is, half of an ellipse. For example, the length L21 of the semi-ellipse 12-2 is smaller than the length L1 of the long axis of the first ellipse 11-1, and the width W21 of the semi-ellipse 12-2 is smaller than or equal to the length W1 of the short axis of the first ellipse 11-1. For example, the first light-transmitting openings 1311 and the sub-pixel openings of the other sub-pixels in this example are the same as those in FIG. 6 and FIG. 7, and will not be repeated here.

For example, in some examples, as shown in FIG. 6-FIG. 8B, one red sub-pixel R, two green sub-pixels G, and one blue sub-pixel B form one pixel unit, and a plurality of pixel units formed of the plurality of sub-pixels are arranged in an array on the base substrate 101. For example, in other embodiments, one red sub-pixel R, one green sub-pixel G, and one blue sub-pixel B may also form one pixel unit, and a plurality of pixel units formed of the plurality of sub-pixels are arranged in an array on the base substrate 101, the embodiments of the present disclosure do not limit the specific form of the pixel units.

Figure 9:
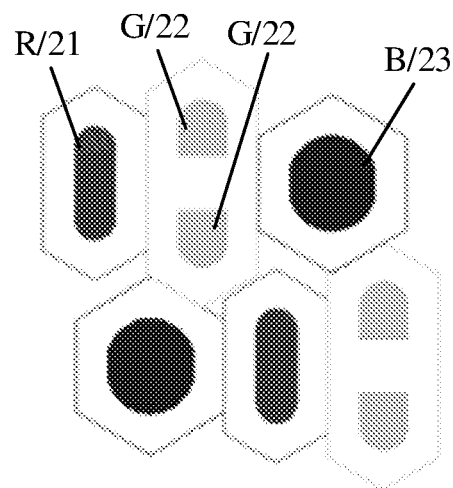
FIG. 9 is still another plan layout diagram of a plurality of sub-pixels of a display substrate provided by at least one embodiment of the present disclosure.
Figure 10:
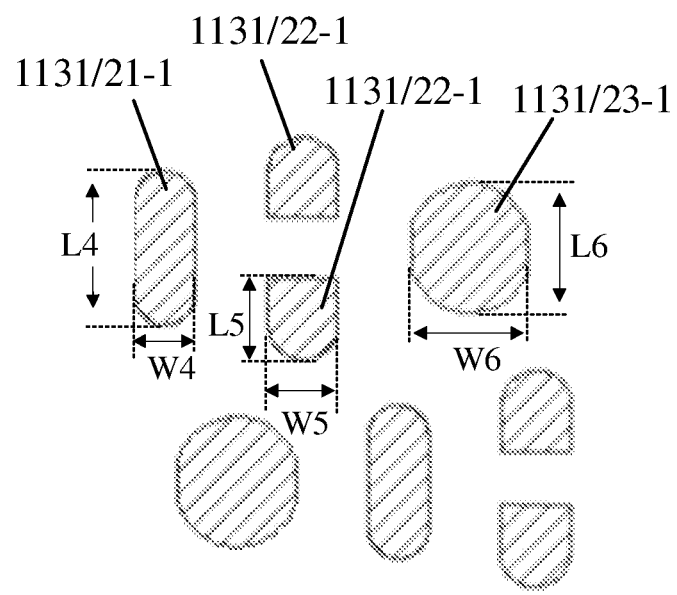
FIG. 10 is a plan layout diagram of a plurality of first light-transmitting openings of a black matrix layer corresponding to a plurality of sub-pixels of the display substrate shown in FIG. 9.

For example, in other embodiments, as shown in FIG. 9 and FIG. 10, the plurality of sub-pixels include a red sub-pixel R, a green sub-pixel G, and a blue sub-pixel B. The first light-transmitting opening 1131 exposing the light-emitting device of the red sub-pixel R is substantially in a shape of a first racetrack 21-1, and the first light-transmitting opening 1131 exposing the light-emitting device of the green sub-pixel G is substantially in a shape of a semi-racetrack 22-1. For example, the length L5 of the semi-racetrack 22-1 is smaller than the length L4 of the long axis of the first racetrack, and the width W5 of the semi-racetrack 22-1 is greater than or equal to the length W4 of the short axis of the first racetrack. The first light-transmitting opening 1131 exposing the light-emitting device of the blue sub-pixel B is substantially in a shape of a third racetrack 23-1, the length L6 of the long axis of the third racetrack 23-1 is smaller than the length L4 of the long axis of the first racetrack 21-1, and the length W6 of the short axis of the third racetrack 23-1 is greater than the length W4 of the short axis of the first racetrack 21-1.

By performing Lab color space detection on the above-mentioned display substrate including the sub-pixel with the shape of a racetrack (or semi-racetrack), it is concluded that the Lab value is 5.18, which is much lower than the lab value, that is 28.3, of the display substrate including the hexagonal sub-pixel (as shown in FIG. 2).

Figure 11A:
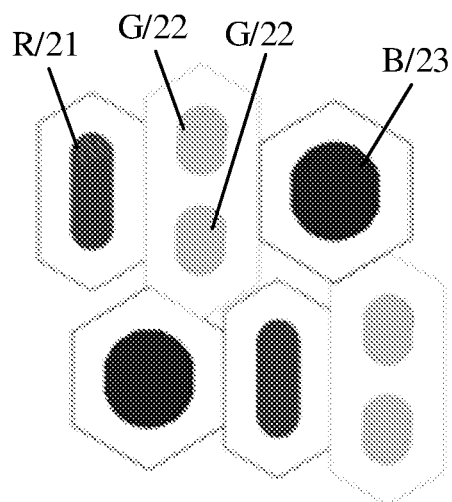
FIG. 11A is still another plan layout diagram of a plurality of sub-pixels of a display substrate provided by at least one embodiment of the present disclosure.
Figure 11B:
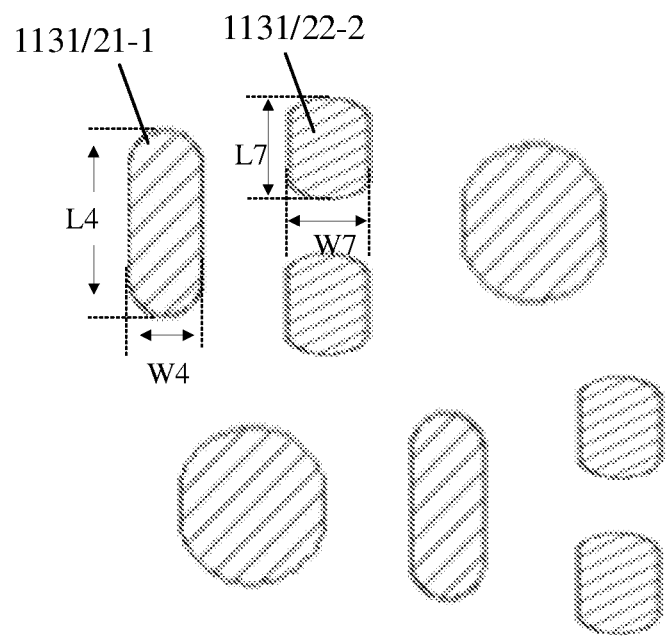
FIG. 11B is a plan layout diagram of a plurality of first light-transmitting openings of a black matrix layer corresponding to a plurality of sub-pixels of the display substrate shown in FIG. 11A.

For example, in other embodiments, as shown in FIG. 11A and FIG. 11B, the first light-transmitting opening 1131 exposing the light-emitting device of the green sub-pixel G is substantially in a shape of a second racetrack 22-2, the length L7 of the long axis of the second racetrack 22-2 is smaller than the length L4 of the long axis of the first racetrack 21-1, and the length W7 of the short axis of the second racetrack 22-2 is smaller than or equal to the length W4 of the short axis of the first racetrack 21-1. Correspondingly, the green sub-pixel opening 22 of the pixel definition layer corresponding to the green sub-pixel G is also in the shape of the second racetrack. The first light-transmitting openings 1311 and the sub-pixel openings of other sub-pixels in this example are the same as those in FIG. 9 and FIG. 10, and will not be repeated here.

For example, in some examples, as shown in FIG. 9-FIG. 11B, one red sub-pixel R, two green sub-pixels G, and one blue sub-pixel B form one pixel unit, and a plurality of pixel units formed of the plurality of sub-pixels are arranged in an array on the base substrate 101. For example, in other embodiments, one red sub-pixel R, one green sub-pixel G, and one blue sub-pixel B may also form one pixel unit, and a plurality of pixel units formed of the plurality of sub-pixels are arranged in an array on the base substrate 101, the embodiments of the present disclosure do not limit the specific form of the pixel units.

Figure 12:
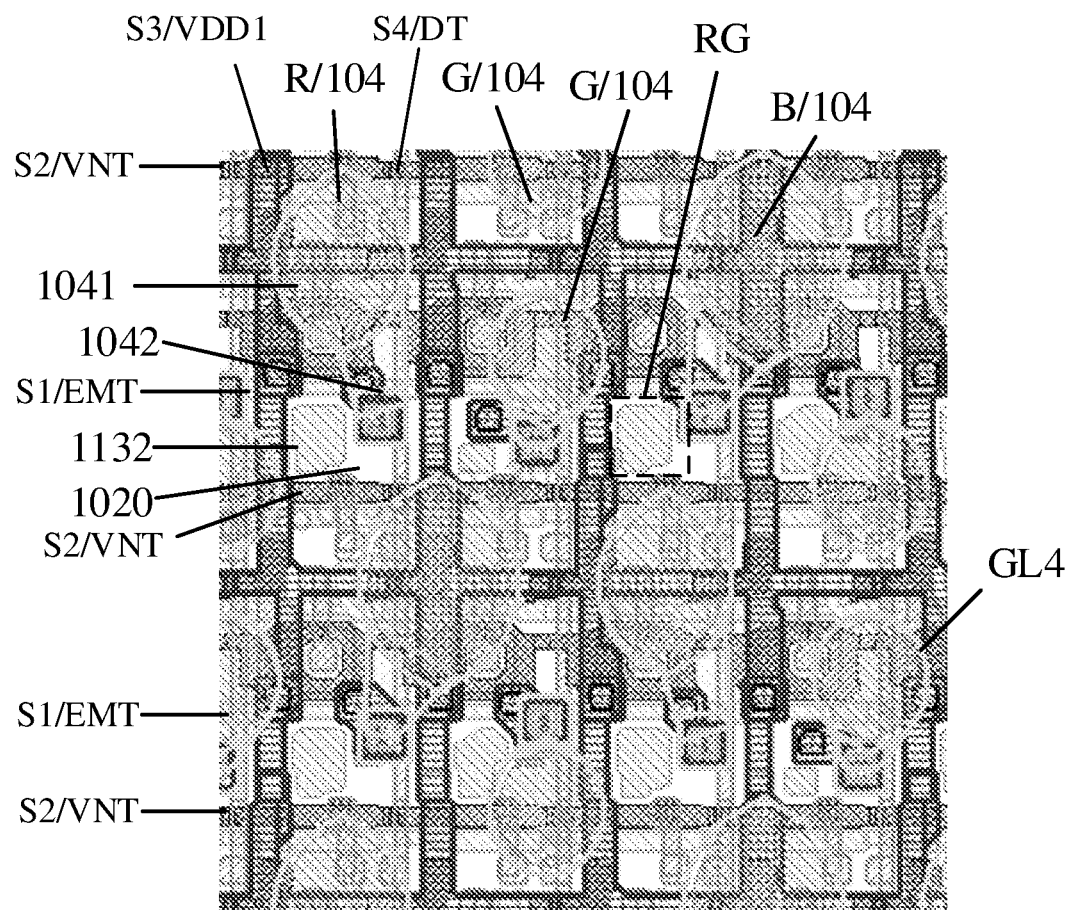
FIG. 12 is a schematic plan view of a display substrate provided by at least one embodiment of the present disclosure.

For example, FIG. 12 shows a schematic plan view of a display substrate provided by at least one embodiment of the present disclosure. As shown in FIG. 12, in this example, one red sub-pixel R, two green sub-pixels G, and one blue sub-pixel B form one pixel unit, and the shapes of the first light-transmitting opening 1131 of the black matrix layer, the sub-pixel opening 1081 of the pixel definition layer, and the main body portion 1041 of the first electrode layer 104 corresponding to each sub-pixel are all elliptical (or called mango shape).

For example, as shown in FIG. 7, the first light-transmitting opening 1131 exposing the light-emitting device of the red sub-pixel includes a first arc-shaped edge RL1 and a second arc-shaped edge RL2 opposite to each other, and a first tip RO1 and a second tip RO2 located at intersections of the first arc-shaped edge RL1 and the second arc-shaped edge RL2, and the first tip RO1 and the second tip RO2 are opposite to each other to form a mango shape.

For example, the first light-transmitting opening 1131 exposing the light-emitting device of the blue sub-pixel includes a third arc-shaped edge BL1 and a fourth arc-shaped edge BL2 opposite to each other, and a third tip BO1 and a fourth tip BO2 located at intersections of the third arc-shaped edge BL1 and the fourth arc-shaped edge BL2, and the third tip BO1 and the fourth tip BO2 are opposite to each other.

For example, the first light-transmitting opening 1131 exposing the light-emitting device of the green sub-pixel includes a fifth arc-shaped edge GL1 and a fifth tip GO1 located at an end of the fifth arc-shaped edge GL1.

In this case, both the first light-transmitting opening exposing the light-emitting device of the red sub-pixel and the first light-transmitting opening exposing the light-emitting device of the blue sub-pixel have two tips provided opposite to each other, and the first light-transmitting opening exposing the light-emitting device of the green sub-pixel has only one tip; this arrangement can reduce the degree of color separation of the display substrate.

It should be noted that, in the embodiments of the present disclosure, because of the actual process accuracy and process error, the formed tip may not have a sharp corner shape, but the curvature of the tip changes relative to the curvature of the arc-shaped edge, for example, the curvature produces a sudden change at the tip.

For example, as shown in FIG. 6, the green sub-pixel opening 12 of the pixel definition layer corresponding to the green sub-pixel G includes a sixth arc-shaped edge GL3 and a sixth tip GO3 located at an end of the sixth arc-shaped edge GL3. As shown in FIG. 12, the main body portion of the first electrode layer of the light-emitting device of the green sub-pixel includes a seventh arc-shaped edge GL4, and the seventh arc-shaped edge GL4 does not include a tip. This arrangement can reduce the degree of color separation that occurs at the positions where the green sub-pixels are located on the display substrate.

For example, as shown in FIG. 12, the black matrix layer includes a plurality of second light-transmitting openings 1132, the driving circuit layer includes a plurality of light-transmitting portions 1020, and one second light-transmitting opening 1132 corresponds to one light-transmitting portion 1020; and for a second light-transmitting opening 1132 and a light-transmitting portion 1020 that are provided corresponding to each other, and in the direction parallel to the surface of the base substrate 101, the plane size of the second light-transmitting opening 1132 is smaller than the plane size of the light-transmitting portion 1020. For example, in some examples, for the second light-transmitting opening 1132 and the light-transmitting portion 1020 that are provided corresponding to each other, the orthographic projection of the second light-transmitting opening 1132 on the base substrate 101 at least partially overlaps with the orthographic projection of the light-transmitting portion 1020 on the base substrate 101. For example, the orthographic projection of the second light-transmitting opening 1132 on the base substrate 101 is located inside/within the orthographic projection of the light-transmitting portion 1020 on the base substrate 101. Thus, as shown in FIG. 3 and FIG. 5, the light L can reach the non-display side (the lower side in the figure) of the display substrate through the second light-transmitting opening 1132 and the light-transmitting portion 1020 in sequence from the display side (the upper side in the figure) of the display substrate, so as to be used for a photosensitive device (such as an image sensor, etc.) that may be provided on the non-display side of the display substrate for photosensitive operation.

For example, in some embodiments, as shown in FIG. 12, the driving circuit layer 102 further includes a first signal line S1 and a second signal line S2 arranged parallel to each other and arranged periodically, and the first signal line S1 and the second signal line S2 are configured to provide different electrical signals to the plurality of sub-pixels SP. For example, the orthographic projections of the plurality of second light-transmitting openings 1132 on the base substrate 101 are respectively located between the orthographic projection of one first signal line S1 on the base substrate 101 and the orthographic projection of one second signal line S2 closest to the one first signal line S1 on the base substrate 101.

For example, in some embodiments, the first signal line S1 is a light-emitting control signal line EMT, and the second signal line is a reset voltage line VNT, which will be described in detail later.

It should be noted that, considering the process errors and structural errors in actual production, the formed signal line may not be a straight line, such as having uneven portions, etc. In the embodiments of the present disclosure, the first signal line S1 and the second signal line S2 are "parallel to each other" means that the angle formed between the extending directions of the first signal line S1 and the second signal line S2 is within a range of 0-15 degrees, but not necessarily parallel in the strict sense.

For example, as shown in FIG. 12, the driving circuit layer includes a third signal line S3 and a fourth signal line S4 arranged parallel to each other and arranged periodically, and the third signal line S3 and the fourth signal line S4 respectively intersect the first signal line S1 and the second signal line S2, for example, perpendicular to the first signal line S1 and the second signal line S2. The third signal line S3 and the fourth signal line S4 are configured to provide different electrical signals to the plurality of sub-pixels, and the orthographic projections of the plurality of second light-transmitting openings 1032 on the base substrate 101 are respectively located between the orthographic projection of one third signal line S3 on the base substrate 101 and the orthographic projection of one fourth signal line S4 adjacent to the one third signal line S3 on the base substrate 101.

For example, in some embodiments, the third signal line S3 is a first power supply line VDD1, and the fourth signal line S4 is a data line DT, which will be described in detail later.

For example, as shown in FIG. 12, the first signal line S1, the second signal line S2, the third signal line S3, and the fourth signal line S4 define a plurality of first regions RG, that is, the regions circled by the dotted frame in the figure, and the orthographic projections of the plurality of second light-transmitting openings 1032 on the base substrate 101 are respectively located within the orthographic projections of the plurality of first regions RG on the base substrate 101.

Figure 13:
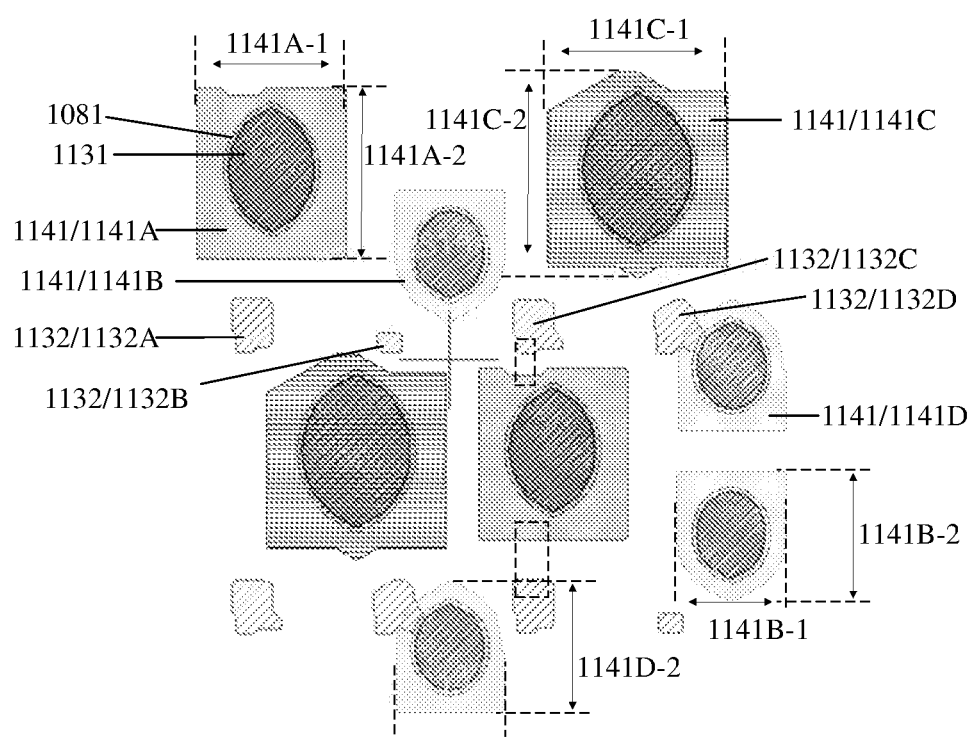
FIG. 13 is a schematic plan view of a black matrix layer and a color film layer of a display substrate provided by at least one embodiment of the present disclosure.

For example, FIG. 13 shows a schematic partial plan view of the black matrix layer and the color film layer of the display substrate, and shows a schematic plan view of a plurality of first light-transmitting openings 1131, a plurality of second light-transmitting openings 1132, and a plurality of color film patterns 1141. As shown in FIG. 13, in the direction perpendicular to the surface of the base substrate 101, the plurality of color film patterns 1141 include a first color film pattern 1141A at least partially overlapping with the light-emitting device of a first sub-pixel (e.g., a red sub-pixel) and a second color film pattern 1141B at least partially overlapping with the light-emitting device of a second sub-pixel (e.g., a green sub-pixel). In the direction parallel to the surface of the base substrate 101, the plane shape of the first color film pattern 1141A is different from the plane shape of the second color film pattern 1141B, and the area of the first color film pattern 1141A is larger than the area of the second color film pattern 1141B.

For example, as shown in FIG. 13, the plane shape of the first color film pattern 1141A is substantially rectangular, such as a rectangle with a notch, and the plane shape of the second color film pattern 1141B is substantially semi-elliptical. For example, the area of the first color film pattern 1141A and the area of the second color film pattern 1141B are respectively larger than the areas of the first light-transmitting openings 1131 covered by them, so as to fully realize the effect of light filtering.

For example, in some examples, the ratio of the area of the first color film pattern 1141A to the area of the second color film pattern 1141B is in a range of (1~1.5):1, such as 1.2:1, 1.4:1, or the like.

For example, as shown in FIG. 13, in the direction perpendicular to the surface of the base substrate 101, the plurality of color film patterns 1141 further include a third color film pattern 1141C at least partially overlapping with the light-emitting device of a third sub-pixel (e.g., a blue sub-pixel). In the direction parallel to the surface of the base substrate 101, the plane shape of the third color film pattern 1141C is different from the plane shape of the first color film pattern 1141A and the plane shape of the second color film pattern 1141B, and the area of the third color film pattern 1141C is larger than the area of the first color film pattern 1141A and the area of the second color film pattern 1141B, respectively. For example, the plane shape of the third color film pattern 1141C is an irregular shape, so as to fully realize the effect of light filtering.

For example, in some embodiments, the ratio of the area of the first color film pattern 1141A, the area of the second color film pattern 1141B, and the area of the third color film pattern 1141C is in a range of (1~1.5):1:(1~1.6), such as 1.2:1:1.1, 1.4:1:1.3, or the like.

For example, as shown in FIG. 13, in the direction perpendicular to the surface of the base substrate 101, the plurality of color film patterns 1141 further include a fourth color film pattern 1141D at least partially overlapping with the light-emitting device of a fourth sub-pixel (e.g., a green sub-pixel). In the direction parallel to the surface of the base substrate 101, the plane shape of the fourth color film pattern 1141D is substantially the same as the plane shape of the second color film pattern 1141B, and the area of the fourth color film pattern 1141D is substantially equal to the area of the second color film pattern 1141B.

For example, the plane shape of the fourth color film pattern 1141D is substantially semi-elliptical, and the area of the fourth color film pattern 1141D is substantially equal to the area of the second color film pattern 1141B, for example, the difference between the area of the fourth color film pattern 1141D and the area of the second color film pattern 1141B is not greater than 10% of the area of the second color film pattern 1141B.

In the embodiments of the present disclosure, the black matrix layer 113 can absorb the light incident into the display substrate, reduce the reflectivity of the display substrate to external light, and improve the display effect of the display substrate; and by covering the black matrix layer 113 with the color film layer 114, the color film layer 114 can absorb the light incident into the display substrate again to further reduce the reflectivity of the display substrate to external light and improve the display effect of the display substrate. After testing the plurality of color film patterns 1141 shown in FIG. 13, it is found that in the case where the plurality of color film patterns 1141 have the shape and size distribution shown in FIG. 13, the plurality of color film patterns 1141 can fully realize the effect of light filtering as well as the effect of light reflecting, which makes the display effect of the display substrate better.

For example, in some embodiments, as shown in FIG. 13, in the direction perpendicular to the surface of the base substrate 101, the fourth color film pattern 1141D partially overlaps with a fourth light-transmitting sub-opening 1132D.

For example, in some examples, as shown in FIG. 13, the lateral size 1141A-1 of the first color film pattern 1141A corresponding to the first sub-pixel P1 ranges from 27 μm to 33 μm, such as 28 μm, 29 μm, 30 μm, or the like, and the longitudinal size 1141A-2 of the first color film pattern 1141A corresponding to the first sub-pixel P1 ranges from 30 μm to 35 μm, such as 32 μm, 33 μm, 34 μm, or the like; the lateral size 1141B-1 of the second color film pattern 1141B corresponding to the second sub-pixel P2 ranges from 20 μm to 25 μm, such as 21 μm, 22 μm, 23 μm, or the like, and the longitudinal size 1141B-2 of the second color film pattern 1141B corresponding to the second sub-pixel P2 ranges from 23 μm to 28 μm, such as 25 μm, 26 μm, 27 μm, or the like; the lateral size 1141C-1 of the third color film pattern 1141C corresponding to the third sub-pixel P3 ranges from 32 μm to 38 μm, such as 34 μm, 35 μm, 36 μm, or the like, and the longitudinal size 1141C-2 of the third color film pattern 1141C corresponding to the third sub-pixel P3 ranges from 35 μm to 45 μm, such as 38 μm, 40 μm, 42 μm, or the like; and the lateral size 1141D-1 of the fourth color film pattern 1141D corresponding to the fourth sub-pixel P4 ranges from 20 μm to 25 μm, such as 21 in, 22 μm, 23 μm, or the like, and the longitudinal size 1141D-2 of the fourth color film pattern 1141D corresponding to the fourth sub-pixel P4 ranges from 23 μm to 28 μm, such as 25 μm, 26 μm, 27 μm, or the like.

For example, in some embodiments, the minimum distance between edges of the plurality of color film patterns 1141 and edges of the plurality of second light-transmitting openings 1132 ranges from 1 μm to 5 μm. For example, as shown in FIG. 3, for the color film pattern 1141 and the second light-transmitting opening 1132 that are at least partially adjacent to each other, there is a space between the color film pattern 1141 and the second light-transmitting opening 1132, and the minimum distance between the edge of the color film pattern 1141 and the edge of the second light-transmitting opening 1132 ranges from 1 μm to 5 μm, so as to prevent the color film pattern 1141 from filtering the light passing through the second light-transmitting opening 1132.

For example, referring to FIG. 13 and FIG. 8A, for one color film pattern 1141 and one sub-pixel opening 1081 corresponding to the same sub-pixel, the plane shape of the one color film pattern 1141 is different from the plane shape of the one sub-pixel opening 1081. For example, at least part of the edges of the plurality of second light-transmitting openings 1132 are parallel to at least part of the edges of the color film patterns 1141 adjacent to the plurality of second light-transmitting openings 1132. For example, in the part shown by the dotted frame in FIG. 13, a part of the edge of the second light-transmitting opening 1132 is parallel to a part of the edge of the color film pattern 1141 adjacent to the second light-transmitting opening 1132.

Hereinafter, the structure and circuit arrangement of each functional layer of the display substrate provided by the embodiments of the present disclosure will be described in detail through a specific example. In this example, the sub-pixel uses a 7T1C pixel driving circuit to drive the light-emitting device EM.

Figure 14A:
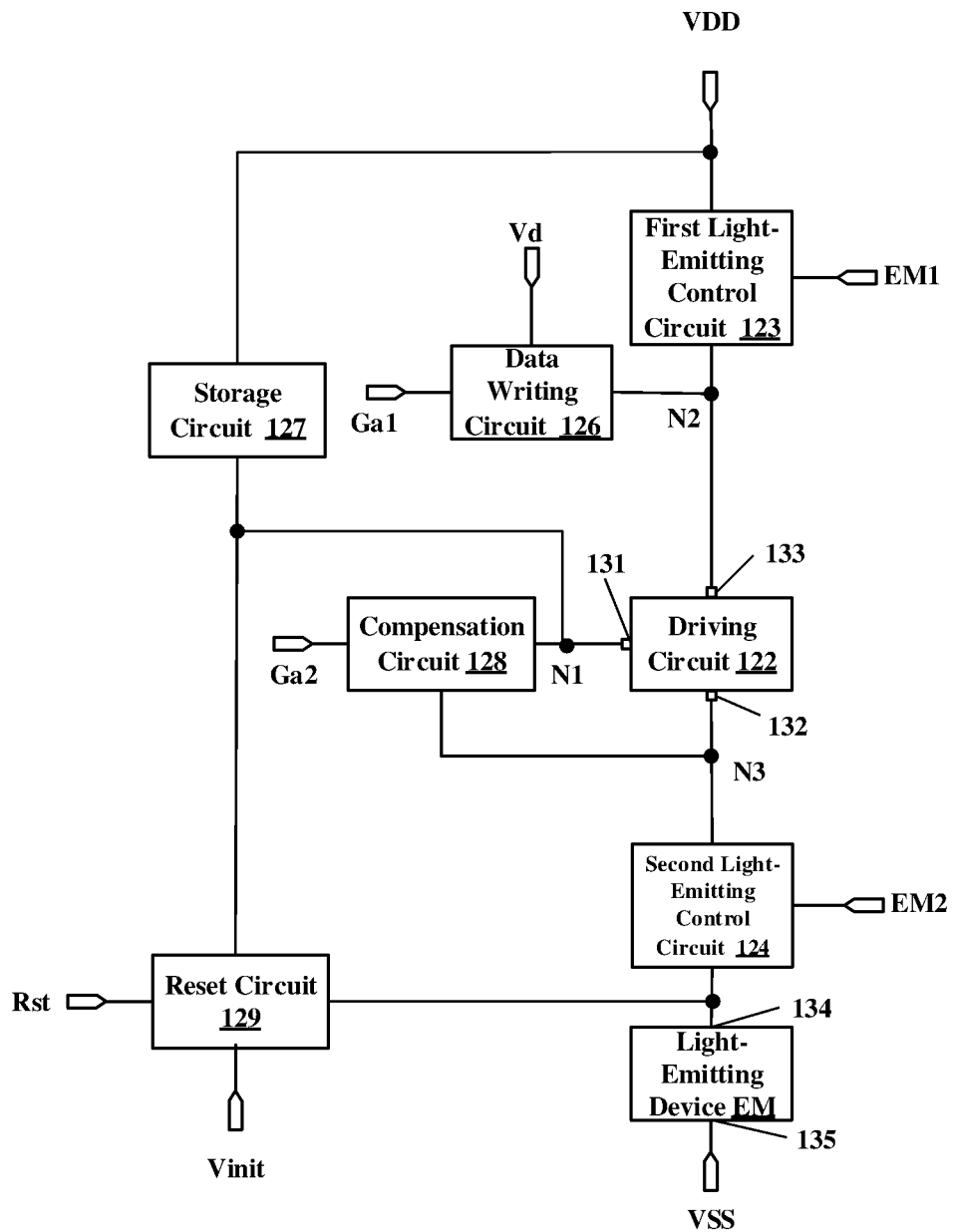
FIG. 14A is a schematic diagram of a pixel driving circuit of a display substrate provided by at least one embodiment of the present disclosure.

For example, FIG. 14A shows a circuit diagram of a 7T1C pixel circuit. As shown in FIG. 14A, the pixel circuit includes a driving circuit 122, a data writing circuit 126, a compensation circuit 128, a storage circuit 127, a first light-emitting control circuit 123, a second light-emitting control circuit 124, and a reset circuit 129.

For example, the driving circuit 122 includes a control terminal 131, a first terminal 132, and a second terminal 133, and the driving circuit 122 is configured to control a driving current flowing through the light-emitting device EM. The control terminal 131 of the driving circuit 122 is connected to a first node N1, the first terminal 132 of the driving circuit 122 is connected to a second node N2, and the second terminal 133 of the driving circuit 122 is connected to a third node N3.

For example, the data writing circuit 126 includes a control terminal, a first terminal, and a second terminal. The control terminal of the data writing circuit 126 is configured to receive a first scan signal, the first terminal of the data writing circuit 126 is configured to receive a data signal, and the second terminal of the data writing circuit 126 is connected to the first terminal 132 (the second node N2) of the driving circuit 122, and is configured to write the data signal to the first terminal 132 of the driving circuit 122 in response to the first scan signal Ga1. For example, the first terminal of the data writing circuit 126 is connected to a data line 12 to receive the data signal, and the control terminal of the data writing circuit 126 is connected to a scan line 11 to receive the first scan signal Ga1.

For example, during a data writing stage, the data writing circuit 126 is turned on in response to the first scan signal Ga1, so that the data signal is written to the first terminal 132 (the second node N2) of the driving circuit 122, and the data signal is stored in the storage circuit 127, and the driving current for driving the light-emitting device EM to emit light is generated according to the data signal during, for example, a light-emitting stage.

For example, the compensation circuit 128 includes a control terminal, a first terminal, and a second terminal. The control terminal of the compensation circuit 128 is configured to receive a second scan signal Ga2, the first terminal and the second terminal of the compensation circuit 128 are electrically connected to the control terminal 131 and the second terminal 133 of the driving circuit 122, respectively, and the compensation circuit 128 is configured to perform threshold compensation on the driving circuit 120 in response to the second scan signal.

For example, the storage circuit 127 is electrically connected to the control terminal 131 of the driving circuit 122 and a first voltage terminal VDD, and is configured to store the data signal written by the data writing circuit 126. For example, during a data writing and compensation stage, the compensation circuit 128 is turned on in response to the second scan signal Ga2, so that the data signal written by the data writing circuit 126 is stored in the storage circuit 127. For example, still during the data writing and compensation stage, the compensation circuit 128 electrically connects the control terminal 131 and the second terminal 133 of the driving circuit 122, so that the relevant information of the threshold voltage of the driving circuit 122 is also correspondingly stored in the storage circuit, and the stored data signal and the threshold voltage are used to control the driving circuit 122 during, for example, the light-emitting stage, so that the output of the driving circuit 122 is compensated.

For example, the first light-emitting control circuit 123 is connected to the first terminal 132 (the second node N2) of the driving circuit 122 and the first voltage terminal VDD, and is configured to apply a first power supply voltage of the first voltage terminal VDD to the first terminal 132 of the driving circuit 122 in response to a first light-emitting control signal. For example, as shown in FIG. 14A, the first light-emitting control circuit 123 is connected to a first light-emitting control terminal EM1, the first voltage terminal VDD, and the second node N2.

For example, the second light-emitting control circuit 124 is connected to a second light-emitting control terminal EM2, a first terminal 134 of the light-emitting device EM, and the second terminal 132 of the driving circuit 122, and is configured to enable the driving current to be applied to the light-emitting device EM in response to a second light-emitting control signal.

For example, during the light-emitting stage, the second light-emitting control circuit 123 is turned on in response to the second light-emitting control signal provided by the second light-emitting control terminal EM2, so that the driving circuit 122 can apply the driving current to the light-emitting device EM to make it emit light through the second light-emitting control circuit 123; while during the non-light-emitting stage, the second light-emitting control circuit 123 is turned off in response to the second light-emitting control signal, so as to avoid current flowing through the light-emitting device EM to make it emit light, which can improve the contrast of the corresponding display device.

For another example, during an initialization stage, the second light-emitting control circuit 124 is also turned on in response to the second light-emitting control signal, so that the reset circuit is combined to perform a reset operation on the driving circuit 122 and the light-emitting device EM.

For example, the second light-emitting control signal EM2 is the same as or different from the first light-emitting control signal EM1. For example, the second light-emitting control signal EM2 and the first light-emitting control signal EM1 are connected to the same signal output terminal or different signal output terminals, respectively.

For example, the reset circuit 129 is connected to a reset voltage terminal Vinit and the first terminal 134 (a fourth node N4) of the light-emitting device EM, and is configured to apply a reset voltage to the first terminal 134 of the light-emitting device EM in response to a reset signal. In other examples, as shown in FIG. 14A, the reset signal is also applied to the control terminal 131 of the driving circuit, that is, the first node N1. For example, the reset signal is the second scan signal, and the reset signal may also be other signals synchronized with the second scan signal, which is not limited in the embodiments of the present disclosure. For example, as shown in FIG. 14A, the reset circuit 129 is respectively connected to the first terminal 134 of the light-emitting device EM, the reset voltage terminal Vinit, and a reset control terminal Rst (a reset control line). For example, during the initialization stage, the reset circuit 129 is turned on in response to the reset signal, so that the reset voltage can be applied to the first terminal 134 of the light-emitting device EM and the first node N1, and the reset operation is performed on the driving circuit 122, the compensation circuit 128, and the light-emitting device EM to eliminate the influence of the previous light-emitting stage.

For example, the light-emitting device EM includes the first terminal 134 and a second terminal 135, the first terminal 134 of the light-emitting device EM is configured to receive the driving current from the second terminal 133 of the driving circuit 122, and the second terminal 135 of the light-emitting device EM is configured to be connected to a second voltage terminal VSS. For example, in one example, as shown in FIG. 14A, the first terminal 134 of the light-emitting device EM is connected to a third node N3 through the second light-emitting control circuit 124. The embodiments of the present disclosure include, but are not limited to, this case. For example, the light-emitting device EM includes various types of OLEDs, such as top emission, bottom emission, double-sided emission, etc., which can emit red, green, blue, or white light, etc., and the first electrode layer and the second electrode layer of the OLED respectively serve as the first terminal 134 and the second terminal 135 of the light-emitting device. The embodiments of the present disclosure do not limit the specific structure of the light-emitting device.

It should be noted that, in the description of the embodiments of the present disclosure, the first node N1, the second node N2, the third node N3, and the fourth node N4 do not necessarily represent actual components, but represent the junctions of related circuit connections in the circuit diagram.

It should be noted that, in the description of the embodiments of the present disclosure, the symbol Vd can represent both the data signal terminal and the level of the data signal. Similarly, the symbols Ga1 and Ga2 can represent both the first scan signal and the second scan signal, as well as the first scan signal terminal and the second scan signal terminal; the symbol Rst can represent both the reset control terminal and the reset signal; the symbol Vinit can represent both the reset voltage terminal and the reset voltage; the symbol VDD can represent both the first voltage terminal and the first power supply voltage; and the symbol VSS can represent both the second voltage terminal and the second power supply voltage. The following embodiments are the same as the above-mentioned case and will not be repeated here.

Figure 14B:
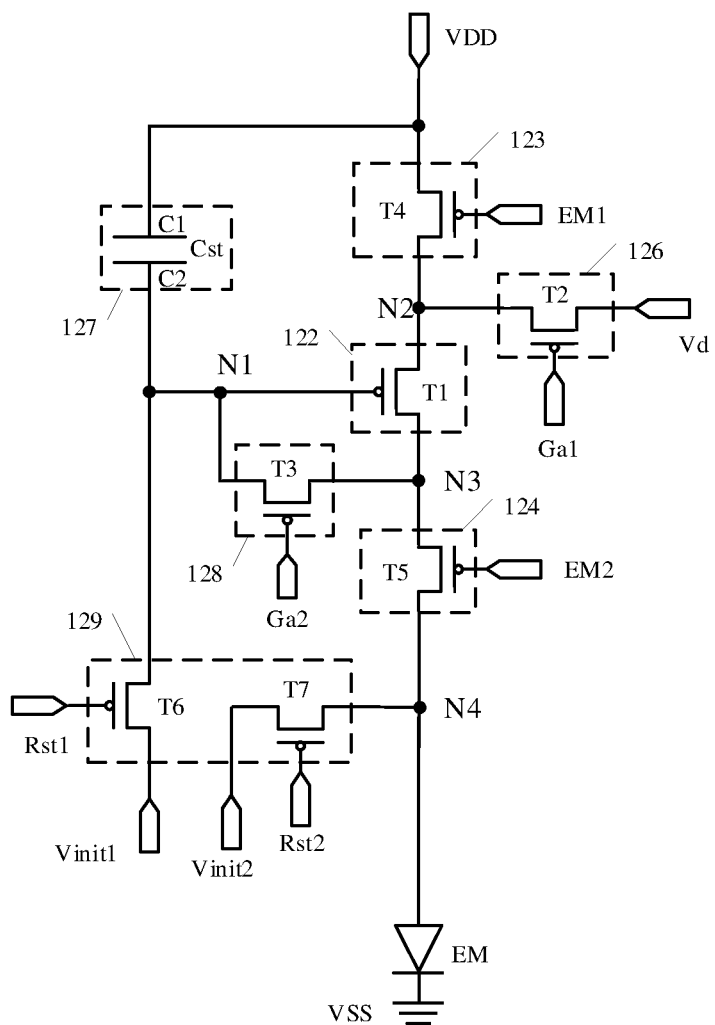
FIG. 14B is a schematic diagram of another pixel driving circuit of a display substrate provided by at least one embodiment of the present disclosure.

FIG. 14B is a circuit diagram of a specific implementation example of the pixel circuit shown in FIG. 14A. As shown in FIG. 14B, the pixel circuit includes first to seventh transistors T1, T2, T3, T4, T5, T6, and T7, and includes a storage capacitor Cst. For example, the first transistor T1 is used as a driving transistor, and the other second to seventh transistors are used as switching transistors.

For example, as shown in FIG. 14B, the driving circuit 122 is implemented as the first transistor T1. A gate electrode of the first transistor T1 serves as the control terminal 131 of the driving circuit 122 and is connected to the first node N1; a first electrode of the first transistor T1 serves as the first terminal 132 of the driving circuit 122 and is connected to the second node N2; and a second electrode of the first transistor T1 serves as the second terminal 133 of the driving circuit 122 and is connected to the third node N3.

For example, as shown in FIG. 14B, the data writing circuit 126 is implemented as the second transistor T2. A gate electrode of the second transistor T2 is connected to a first scan line (the first scan signal terminal Ga1) to receive the first scan signal, a first electrode of the second transistor T2 is connected to a data line (the data signal terminal Vd) to receive the data signal, and a second electrode of the second transistor T2 is connected to the first terminal 132 (the second node N2) of the driving circuit 122. For example, the second transistor T2 is a P-type transistor, for example, a thin film transistor in which the active layer is formed by low temperature doped polysilicon.

For example, as shown in FIG. 14B, the compensation circuit 128 is implemented as the third transistor T3. A gate electrode of the third transistor T3 is configured to be connected to a second scan line (the second scan signal terminal Ga2) to receive the second scan signal, a first electrode of the third transistor T3 is connected to the control terminal 131 (the first node N1) of the driving circuit 122, and a second electrode of the third transistor T3 is connected to the second terminal 133 (the third node N3) of the driving circuit 122.

For example, as shown in FIG. 14B, the storage circuit 127 is implemented as the storage capacitor Cst, the storage capacitor Cst includes a first capacitor electrode C1 and a second capacitor electrode C2, the first capacitor electrode C1 is connected to the first voltage terminal VDD, and the second capacitor electrode C2 is connected to the control terminal 131 of the driving circuit 122.

For example, as shown in FIG. 14B, the first light-emitting control circuit 123 is implemented as the fourth transistor T4. A gate electrode of the fourth transistor T4 is connected to a first light-emitting control line (the first light-emitting control terminal EM1) to receive the first light-emitting control signal, a first electrode of the fourth transistor T4 is connected to the first voltage terminal VDD to receive the first power supply voltage, and a second electrode of the fourth transistor T4 is connected to the first terminal 132 (the second node N2) of the driving circuit 122.

For example, the light-emitting device EM is implemented as an organic light-emitting diode (OLED), the first electrode layer (here, the anode) of the light-emitting device EM is connected to the fourth node N4 and is configured to receive the driving current from the second terminal 133 of the driving circuit 122 through the second light-emitting control circuit 124, and the second electrode layer (here, the cathode) of the light-emitting device EM is configured to be connected to the second voltage terminal VSS to receive the second power supply voltage. For example, the second voltage terminal is grounded, that is, VSS is at 0V.

For example, the second light-emitting control circuit 124 is implemented as the fifth transistor T5. A gate electrode of the fifth transistor T5 is connected to a second light-emitting control line (the second light-emitting control terminal EM2) to receive the second light-emitting control signal, a first electrode of the fifth transistor T5 is connected to the second terminal 133 (the third node 133) of the driving circuit 122, and a second electrode of the fifth transistor T5 is connected to the first terminal 134 (the fourth node N4) of the light-emitting device EM.

For example, the reset circuit 129 includes a first reset circuit and a second reset circuit, the first reset circuit is configured to apply a first reset voltage Vini1 to the first node N1 in response to a first reset signal Rst1, and the second reset circuit is configured to apply a second reset voltage Vini2 to the fourth node N4 in response to a second reset signal Rst2. For example, as shown in FIG. 14B, the first reset circuit is implemented as the sixth transistor T6, and the second reset circuit is implemented as the seventh transistor T7. A gate electrode of the sixth transistor T6 is configured to be connected to a first reset control terminal Rst1 to receive the first reset signal Rst1, a first electrode of the sixth transistor T6 is connected to a first reset voltage terminal Vinit1 to receive the first reset voltage Vinit1, and a second electrode of the six transistors T6 is configured to be connected to the first node N1. A gate electrode of the seventh transistor T7 is configured to be connected to a second reset control terminal Rst2 to receive the second reset signal Rst2, a first electrode of the seventh transistor T7 is connected to a second reset voltage terminal Vinit2 to receive the second reset voltage Vinit2, and a second electrode of the seven transistor T7 is configured to be connected to the fourth node N4.

It should be noted that each of the transistors used in the embodiments of the present disclosure may be a thin film transistor, a field effect transistor, or other switching components having the same characteristics. In the embodiments of the present disclosure, the thin film transistor is taken as an example for description. The source electrode and drain electrode of the transistor used here may be structurally symmetrical, so that the source electrode and the drain electrode may be structurally indistinguishable. In the embodiments of the present disclosure, in order to distinguish the two electrodes of the transistor except the gate electrode, one electrode is directly described as the first electrode, and the other electrode is described as the second electrode.

For example, referring to FIG. 12, the first signal line S1 is a light-emitting control line EMT, which is used to transmit the above-mentioned first light-emitting control signal EM1 and the second light-emitting control signal EM2. The second signal line S2 is a reset voltage line VNT, which is used to transmit the above-mentioned first reset voltage Vinit1 and the second reset voltage Vini2. For example, a side of the reset voltage line VNT away from the light-emitting control line EMT further has a reset control line RST for transmitting the above-mentioned first reset signal Rst1 and second reset signal Rst2.

The layout design of the above-mentioned pixel driving circuit will be described in detail below.

Figure 15:
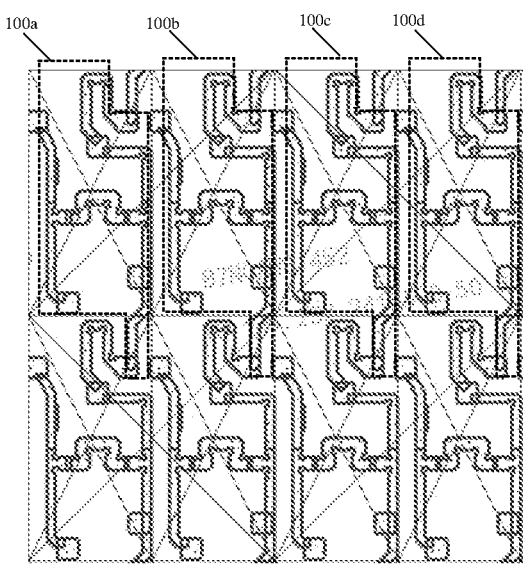
FIG. 15-FIG. 21B are schematic partial plan views of respective functional layers of a display substrate and schematic partial plan views of the respective functional layers stacked in sequence provided by at least one embodiment of the present disclosure.

For example, FIG. 15 shows a schematic diagram of a semiconductor layer of the display substrate, the semiconductor layer is used to form the active layers of the thin film transistors T1 to T7 of the pixel driving circuits of the plurality of sub-pixels. FIG. 12 shows pixel driving circuits of two rows of sub-pixels, and the following takes the pixel driving circuits of four directly adjacent sub-pixels (i.e., a first sub-pixel 100a, a second sub-pixel 100b, a third sub-pixel 100c, and a fourth sub-pixel 100d) as an example. The dotted frame in the figure shows the region where the pixel driving circuit of each sub-pixel is located, and the embodiments of the present disclosure are not limited to this layout.

For example, a first gate insulating layer is further provided on the semiconductor layer, which is not shown in the figure, and reference may be made to the first gate insulating layer 1024 in FIG. 3 or FIG. 5.

Figure 16A:
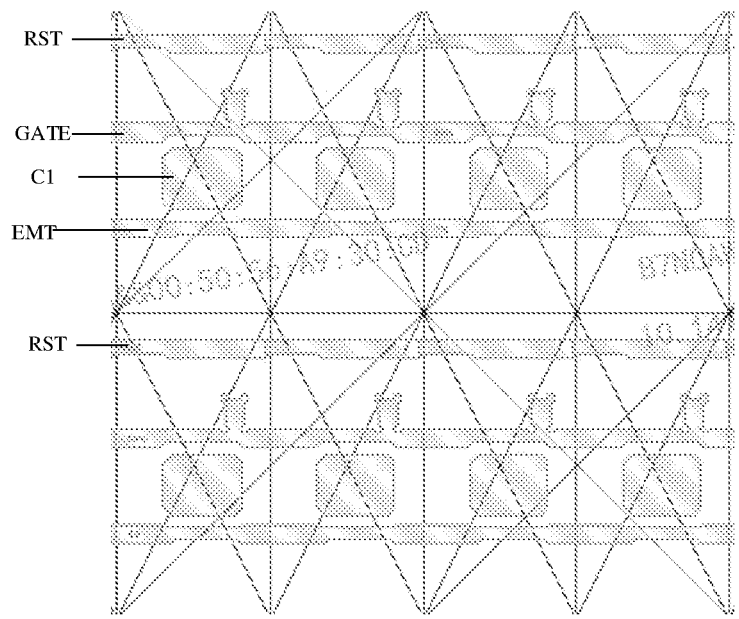
Figure 16B:
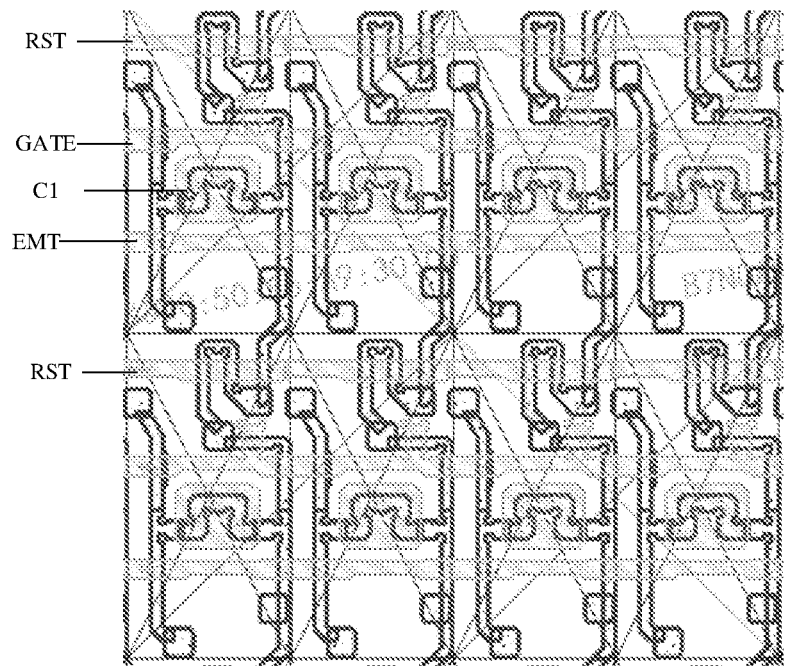

For example, FIG. 16A shows a schematic diagram of a first gate metal layer of the display substrate, the first gate metal layer is provided on the first gate insulating layer, and FIG. 16B shows a schematic diagram of a stacked layer, in which the first gate metal layer and the semiconductor layer are stacked, of the display substrate.

For example, as shown in FIG. 16A and FIG. 16B, the first gate metal layer includes a plurality of light-emitting control lines EMT, a plurality of reset control lines RST, a plurality of scan lines GATE, and the first capacitor electrodes C1 of a plurality of storage capacitors Cst, for example, the portions of the light-emitting control line EMT, the reset control line RST, the scan line GATE, and the first capacitor electrode C1 of the storage capacitor Cst overlapping with the active layers of the thin film transistors T1 to T7 constitute the gate electrodes of the thin film transistors T1 to T7. The plurality of light-emitting control lines EMT, the plurality of reset control lines RST, and the plurality of scan lines GATE are respectively electrically connected to the plurality of rows of sub-pixels in one-to-one correspondence to provide corresponding electrical signals.

For example, a second gate insulating layer is further provided on the first gate metal layer, which is not shown in the figure, and reference may be made to the second gate insulating layer 1025 in FIG. 3 and FIG. 5.

Figure 17A:
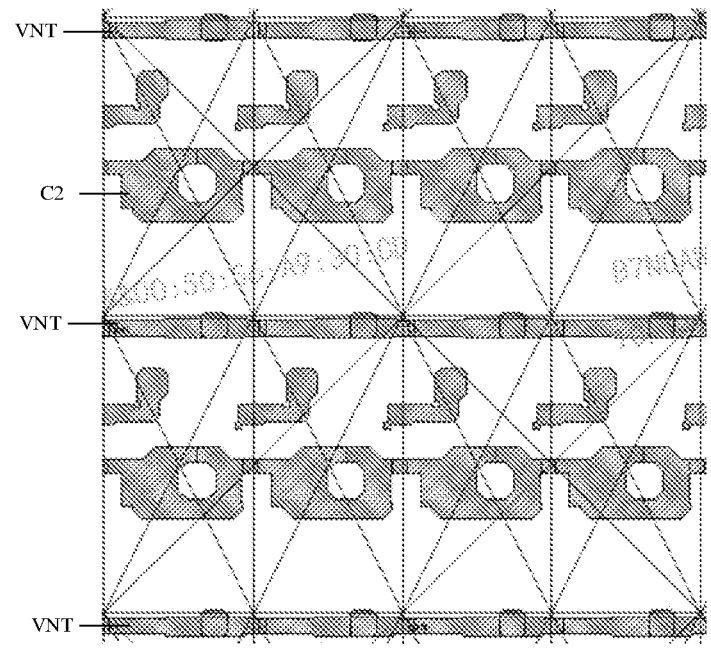
Figure 17B:
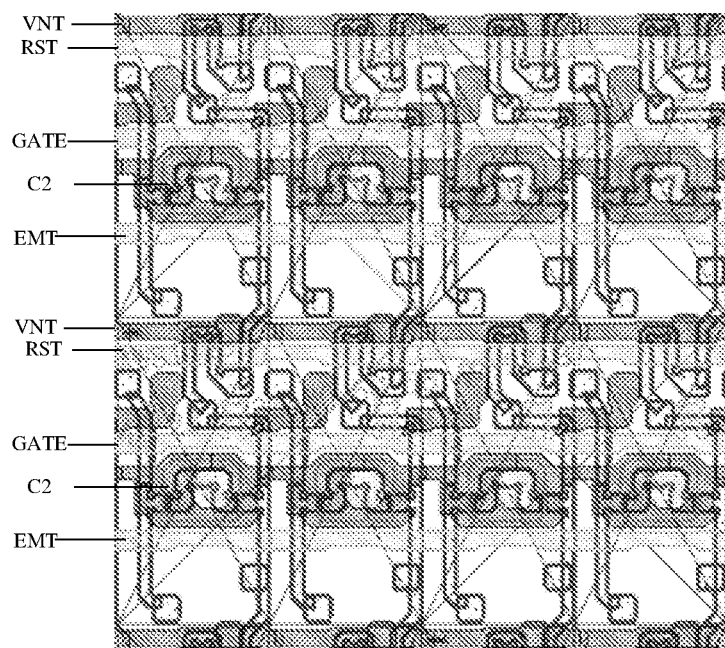

FIG. 17A shows a schematic diagram of a second gate metal layer of the display substrate, the second gate metal layer is provided on the second gate insulating layer, and FIG. 17B shows a schematic diagram of a stacked layer, in which the second gate metal layer, the first gate metal layer, and the semiconductor layer are stacked, of the display substrate.

For example, as shown in FIG. 17A and FIG. 17B, the second gate metal layer includes the second capacitor electrode C2 of the storage capacitor Cst and a plurality of reset voltage lines VNT. The second capacitor electrode C2 of the storage capacitor Cst at least partially overlaps with the first capacitor electrode C1 to form a capacitor. The plurality of reset voltage lines VNT are electrically connected to the plurality of rows of sub-pixels in one-to-one correspondence to provide corresponding electrical signals.

For example, an interlayer insulating layer is further provided on the second gate metal layer, which is not shown in the figures, and reference may be made to the interlayer insulating layer 1026 in FIG. 3 and FIG. 5.

Figure 18A:
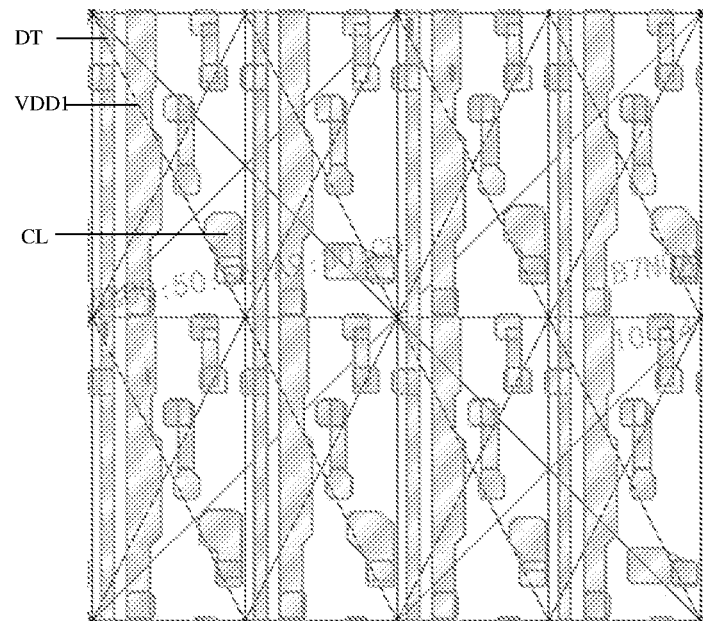
Figure 18B:
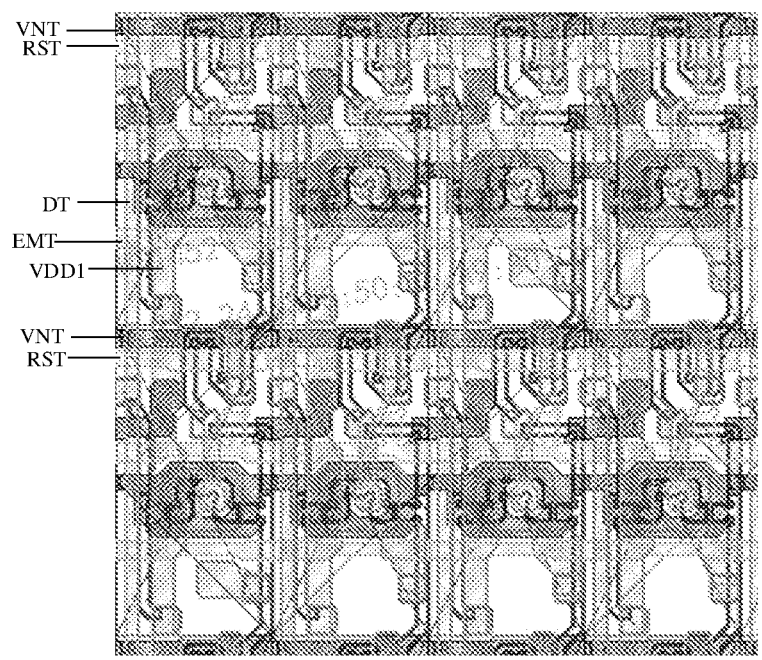

FIG. 18A shows a schematic diagram of a first source-drain metal layer of the display substrate, the first source-drain metal layer is provided on the interlayer insulating layer, and FIG. 18B shows a schematic diagram of a stacked layer, in which the first source-drain metal layer, the second gate metal layer, the first gate metal layer, and the semiconductor layer are stacked, of the display substrate.

As shown in FIG. 18A and FIG. 18B, the first source-drain metal layer includes a plurality of first power supply lines VDD1. For example, the plurality of first power supply lines VDD1 are respectively electrically connected to the plurality of columns of sub-pixels in one-to-one correspondence to provide the first power supply voltage. For example, the first source-drain metal layer further includes a plurality of data lines DT. The plurality of data lines DT are electrically connected to the plurality of columns of sub-pixels in one-to-one correspondence to provide data signals. For example, the first source-drain metal layer further includes a plurality of connection electrodes CL for connecting the second capacitor electrode C2 to the first electrode of the third transistor T3, or connecting the first electrode of the sixth transistor T6 to the reset voltage line VNT, or connecting the second electrode of the fifth transistor T5 to the first electrode layer of the light-emitting device, etc.

For example, a passivation layer and a planarization layer are further provided on the first source-drain metal layer, which are not shown in the figures, and reference may be made to the passivation layer 1027 and the planarization layer 1091 in FIG. 3 and FIG. 5.

Figure 19A:
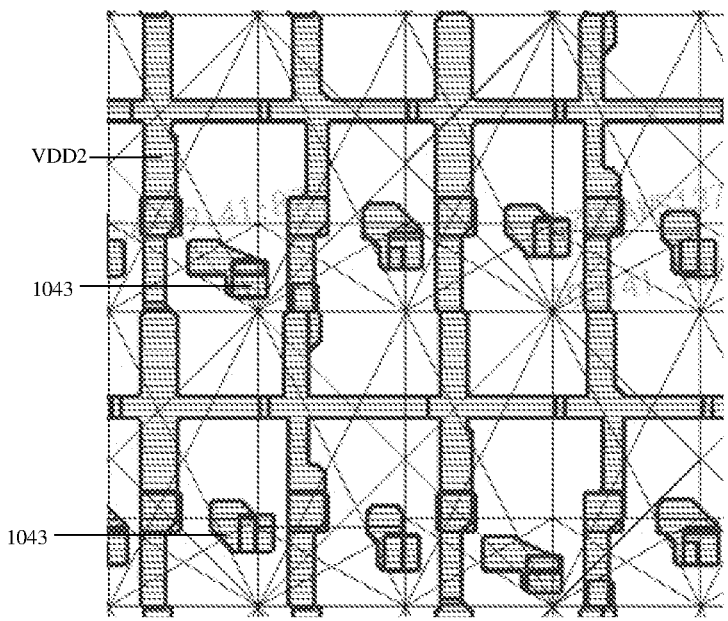
Figure 19B:
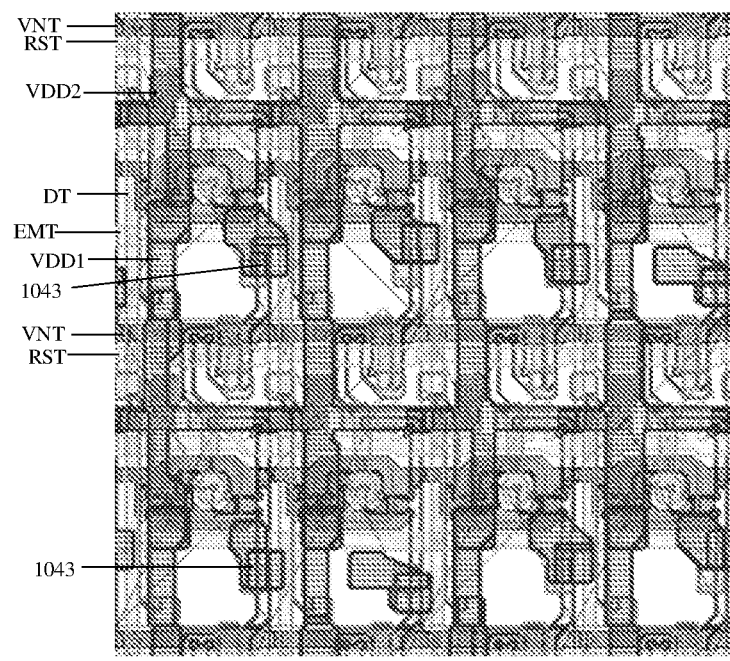

FIG. 19A shows a schematic diagram of a second source-drain metal layer of the display substrate, and the second source-drain metal layer is provided on the planarization layer 1091. FIG. 19B shows a schematic diagram of a stacked layer, in which the second source-drain metal layer, the first source-drain metal layer, the second gate metal layer, the first gate metal layer, and the semiconductor layer are stacked, of the display substrate.

As shown in FIG. 19A and FIG. 19B, the second source-drain metal layer includes a second power supply line VDD2, and the second power supply line VDD2 is in a grid shape. For example, the second power supply line VDD2 is electrically connected to the first power supply line VDD1 to help reduce the resistance on the power supply line, thereby reducing the voltage drop of the power supply line, and to help uniformly transmit the first power supply voltage to each sub-pixel of the display substrate. For example, the second source-drain metal layer further includes a connection electrode 1043 for connecting the first electrode layer of the light-emitting device to the first electrode of the first transistor T1. For example, in the direction perpendicular to the surface of the base substrate, the second power supply line VDD2 at least partially overlaps with the main body portion 1042 of the first electrode layer 104.

Figure 20:
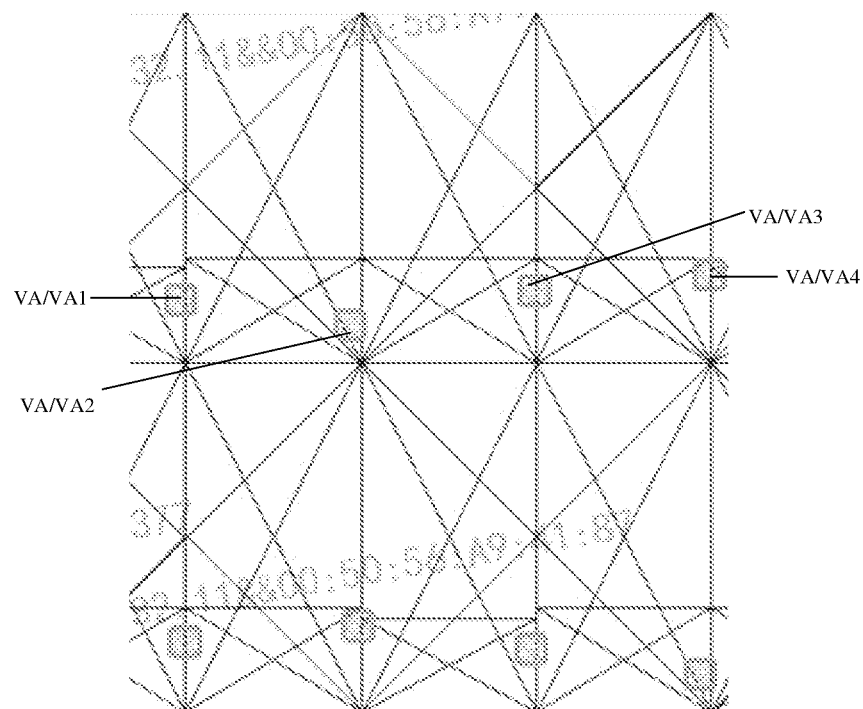

For example, another planarization layer, that is, a planarization layer 109, is further provided on the second source-drain metal layer, FIG. 20 shows a schematic plan view of the planarization layer, and in conjunction with FIG. 3 and FIG. 5, the planarization layer 109 has a plurality of vias VA. In this case, the first electrode layer 104 is connected to the connection electrode 1043 through the via VA in the planarization layer 109.

For example, the plurality of vias VA of the planarization layer 109 corresponding to a plurality of sub-pixels located in the same row are not in a straight line. For example, as shown in FIG. 20, one first sub-pixel (e.g., a red sub-pixel), one second sub-pixel (e.g., a green sub-pixel), one third sub-pixel (e.g., a blue sub-pixel), and one fourth subpixel (e.g., a green sub-pixel) that are adjacent to each other and in the same row respectively correspond to vias VA1 to VA4, and the vias VA1 to VA4 are not arranged in the same straight line.

By designing the plurality of vias VA of the planarization layer 109 not to be in a straight line, the lines of the pixel driving circuit can avoid a larger light-transmitting area, thereby forming a light-transmitting portion with a sufficient area.

Figure 21A:
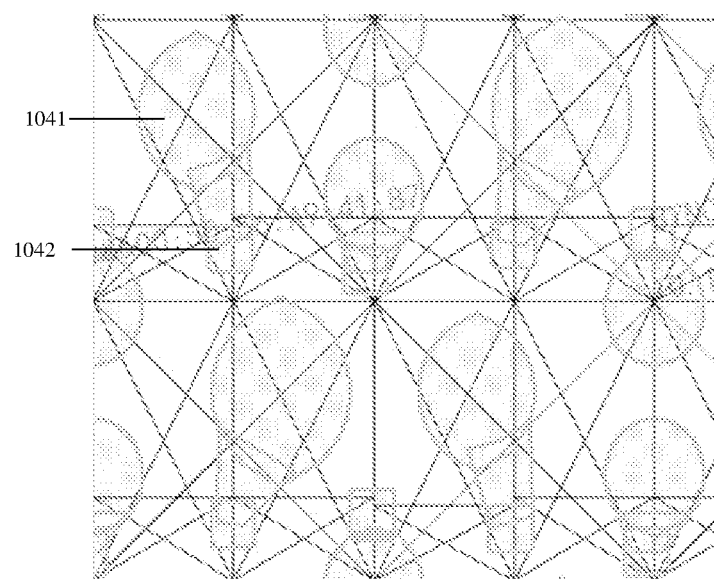
Figure 21B:
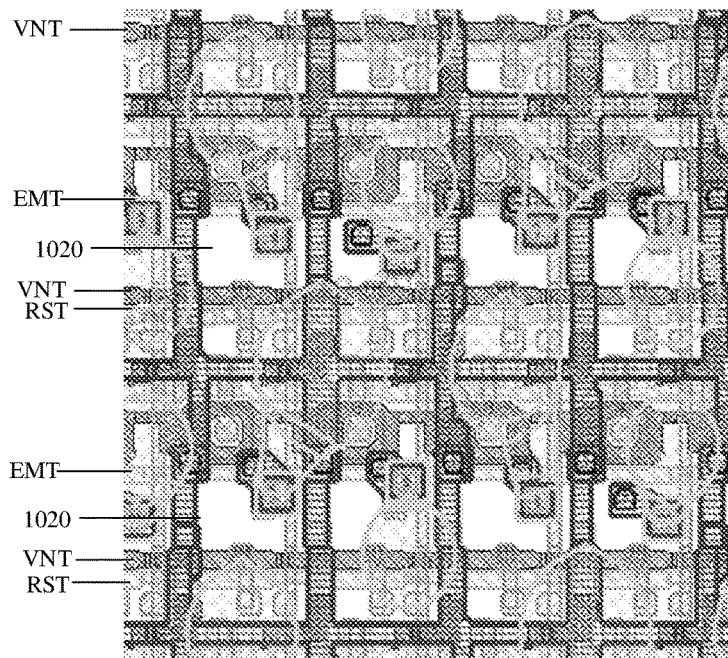

FIG. 21A shows a schematic diagram of a first electrode material layer of the display substrate, and the first electrode material layer is provided on the passivation layer 109. FIG. 21B shows a schematic diagram of a stacked layer, in which the first electrode material layer, the second source-drain metal layer, the first source-drain metal layer, the second gate metal layer, the first gate metal layer, and the semiconductor layer are stacked, of the display substrate.

As shown in FIG. 21A and FIG. 21B, the first electrode material layer includes the first electrode layers of the light-emitting devices EM of the plurality of sub-pixels, and the first electrode layers of the light-emitting devices EM of the plurality of sub-pixels are connected to the connection electrodes 1043 through the plurality of vias VA in the planarization layers 109, respectively. For example, a light-emitting material layer of the light-emitting device EM is provided on the first electrode layer, and a second electrode layer is provided on the light-emitting material layer.

For example, other functional layers such as an encapsulation layer, a black matrix layer, a protective cover plate 115, and the like are further formed above the light-emitting device EM, which will not be repeated here.

Figure 22:
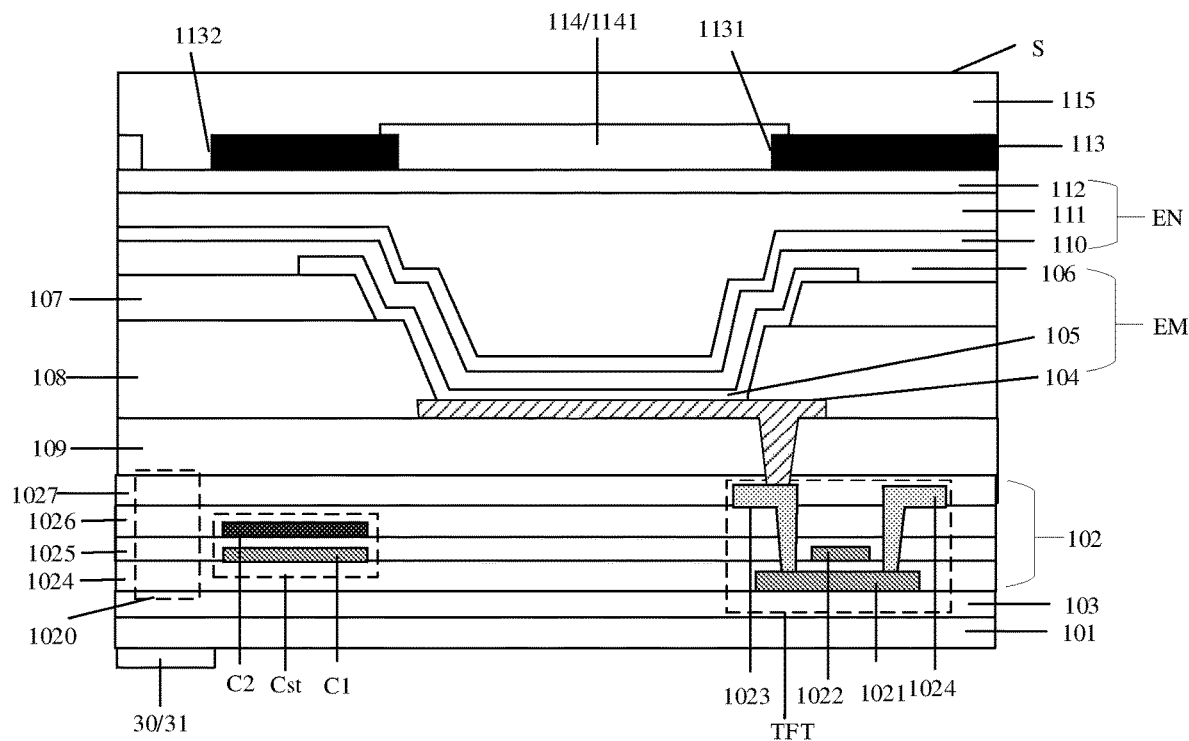
FIG. 22 is a schematic cross-sectional view of a display device provided by at least one embodiment of the present disclosure.

At least one embodiment of the present disclosure further provides a display device, and FIG. 22 shows a schematic cross-sectional view of the display device. As shown in FIG. 22, the display device includes the display substrate provided by the embodiments of the present disclosure, and the display substrate shown in FIG. 3 is shown in FIG. 22 as an example.

For example, as shown in FIG. 22, the display device further includes a texture touch surface S and an image sensor array 30, for example, the surface of the protective cover plate 115 is implemented as the texture touch surface S. The image sensor array is provided on the side of the driving circuit layer 102 away from the light-emitting device layer, and includes a plurality of image sensors 31 (one image sensor is shown as an example in the figure), and the plurality of image sensors 31 are configured to receive light, which is emitted from the plurality of light-emitting devices EM in the light-emitting device layer, reflected by a texture (e.g., a fingerprint, a palm print, etc.) on the texture touch surface S, and reaching the plurality of image sensors 31, for texture collection.

For example, referring to FIG. 12, the black matrix layer includes the plurality of second light-transmitting openings 1132, the driving circuit layer includes the plurality of light-transmitting portions 1020, and one second light-transmitting opening 1132 corresponds to one light-transmitting portion 1020. In this case, the plurality of image sensors 31 are configured to receive light, which is emitted from the plurality of light-emitting devices EM in the light-emitting device layer, reflected by a texture on the texture touch surface S, and reaching the plurality of image sensors 31 through the plurality of second light-transmitting openings 1132 of the black matrix layer 113 and the plurality of light-transmitting portions 1020 of the driving circuit layer, for texture collection. Thus, the plurality of image sensors 31 can sufficiently receive the light reflected by the texture through the plurality of second light-transmitting openings 1132 and the plurality of light-transmitting portions 1020, thereby increasing the speed of texture recognition and the accuracy of texture recognition.

The display device provided by the embodiments of the present disclosure may further have other structures, and reference may be made to the related art for details, which will not be repeated here.

The following statements should be noted:
(1) The drawings of the present disclosure involve only the structure(s) in connection with the embodiment(s) of the present disclosure, and other structure(s) can be referred to common design(s).
(2) For clarity, in the drawings used to describe the embodiments of the present disclosure, the thicknesses of layers or regions are enlarged or reduced, that is, the drawings are not drawn to actual scale. It can be understood that when a component such as a layer, film, region or substrate is referred to as being "on" or "under" another component, the component may be "directly" "on" or "under" another component, or one or more intermediate components may be interposed therebetween.
(3) In case of no conflict, features in one embodiment or in different embodiments can be combined to obtain new embodiments.

What have been described above are only specific implementations of the present disclosure, the protection scope of the present disclosure is not limited thereto, and the protection scope of the present disclosure should be based on the protection scope of the claims.

What is claimed is:

1. A display substrate, having a plurality of sub-pixels arranged in an array, and comprising a base substrate, a driving circuit layer on the base substrate, a pixel definition layer and a light-emitting device layer on a side of the driving circuit layer away from the base substrate, and a black matrix layer on a side of the light-emitting device layer away from the base substrate,
   wherein each of the plurality of sub-pixels comprises a pixel driving circuit in the driving circuit layer and a light-emitting device in the light-emitting device layer, and the pixel driving circuit is configured to drive the light-emitting device;
   the pixel definition layer comprises a plurality of sub-pixel openings, the light-emitting device comprises a first electrode layer, a light-emitting material layer, and a second electrode layer that are sequentially stacked in a direction away from the base substrate, the pixel definition layer is on a side of the first electrode layer away from the base substrate, and the plurality of sub-pixel openings respectively expose first electrode layers of light-emitting devices of the plurality of sub-pixels;
   the black matrix layer includes a plurality of first light-transmitting openings respectively exposing the light-emitting devices of the plurality of sub-pixels in a direction perpendicular to a surface of the base substrate, and at least one of the plurality of first light-transmitting openings has an arc-shaped edge; and
   in the direction perpendicular to the surface of the base substrate, at least part of the plurality of sub-pixel openings are in one-to-one correspondence with and at least partially overlapped with the plurality of first light-transmitting openings;
   the first electrode layer comprises a main body portion and a connection portion, the connection portion is configured to be electrically connected to the pixel driving circuit, and at least part of the main body portion is exposed by the sub-pixel opening; and in a direction parallel to the surface of the base substrate, a plane shape of the main body portion is at least partially same as a plane shape of the sub-pixel opening.

2. The display substrate according to claim 1, wherein in a direction parallel to the surface of the base substrate, a plane shape of at least one of the plurality of first light-transmitting openings is elliptical, semi-elliptical, circular, semi-circular, racetrack-shaped, or semi-racetrack-shaped.

3. The display substrate according to claim 1, wherein in a direction parallel to the surface of the base substrate, a plane shape of at least one of the plurality of sub-pixel openings is elliptical, semi-elliptical, circular, semi-circular, racetrack-shaped, or semi-racetrack-shaped.

4. The display substrate according to claim 1, wherein for a sub-pixel opening and a first light-transmitting opening that are provided corresponding to each other, and in a direction parallel to the surface of the base substrate, a plane shape of the sub-pixel opening is same as a plane shape of the first light-transmitting opening.

5. The display substrate according to claim 4, wherein an orthographic projection of the sub-pixel opening on the base substrate is located within an orthographic projection of the first light-transmitting opening on the base substrate.

6. The display substrate according to claim 5, wherein a minimum distance between an edge of the orthographic projection of the sub-pixel opening on the base substrate and an edge of the orthographic projection of the first light-transmitting opening on the base substrate ranges from 1 µm to 3 µm.

7. The display substrate according to claim 1, wherein an orthographic projection of the sub-pixel opening on the base substrate is located within an orthographic projection of the main body portion on the base substrate;
an orthographic projection of a first light-transmitting opening corresponding to the sub-pixel opening on the base substrate is located within the orthographic projection of the main body portion on the base substrate.

8. The display substrate according to claim 7, wherein a minimum distance between an edge of the orthographic projection of the sub-pixel opening on the base substrate and an edge of the orthographic projection of the main body portion on the base substrate ranges from 1 µm to 5 µm.

9. The display substrate according to claim 8, wherein the orthographic projection of the main body portion on the base substrate is located within an orthographic projection of a first light-transmitting opening corresponding to the sub-pixel opening on the base substrate.

10. The display substrate according to claim 1, further comprising a color film layer, wherein the color film layer comprises a plurality of color film patterns, and the plurality of color film patterns are respectively provided in the plurality of first light-transmitting openings.

11. The display substrate according to claim 1, wherein the black matrix layer further includes a plurality of second light-transmitting openings, and the plurality of second light-transmitting openings are respectively between the plurality of first light-transmitting openings, and the driving circuit layer comprises a plurality of light-transmitting portions; and
at least part of the plurality of second light-transmitting openings are in one-to-one correspondence with at least part of the plurality of light-transmitting portions, and are configured to transmit light in a predetermined angle range with the surface of the base substrate.

12. The display substrate according to claim 11, wherein for a second light-transmitting opening and a light-transmitting portion that are provided corresponding to each other, and in a direction parallel to the surface of the base substrate, a plane size of the second light-transmitting opening is smaller than a plane size of the light-transmitting portion.

13. The display substrate according to claim 12, wherein for the second light-transmitting opening and the light-transmitting portion that are provided corresponding to each other, an orthographic projection of the second light-transmitting opening on the base substrate at least partially overlaps with an orthographic projection of the light-transmitting portion on the base substrate.

14. The display substrate according to claim 1, wherein the plurality of sub-pixels comprise a red sub-pixel, a green sub-pixel, and a blue sub-pixel;
a first light-transmitting opening exposing a light-emitting device of the red sub-pixel is substantially in a shape of a first ellipse;
a first light-transmitting opening exposing a light-emitting device of the green sub-pixel is substantially in a shape of a second ellipse, a length of a long axis of the second ellipse is smaller than a length of a long axis of the first ellipse, and a length of a short axis of the second ellipse is smaller than a length of a short axis of the first ellipse; or, the first light-transmitting opening exposing the light-emitting device of the green sub-pixel is substantially in a shape of a semi-ellipse; and
a first light-transmitting opening exposing a light-emitting device of the blue sub-pixel is substantially in a shape of a third ellipse, a length of a long axis of the third ellipse is smaller than the length of the long axis of the first ellipse, and a length of a short axis of the third ellipse is greater than the length of the short axis of the first ellipse.

15. The display substrate according to claim 14, wherein the first light-transmitting opening exposing the light-emitting device of the red sub-pixel comprises a first arc-shaped edge and a second arc-shaped edge opposite to each other, and a first tip and a second tip at intersections of the first arc-shaped edge and the second arc-shaped edge, and the first tip and the second tip are opposite to each other;
the first light-transmitting opening exposing the light-emitting device of the blue sub-pixel comprises a third arc-shaped edge and a fourth arc-shaped edge opposite to each other, and a third tip and a fourth tip at intersections of the third arc-shaped edge and the fourth arc-shaped edge, and the third tip and the fourth tip are opposite to each other; and
the first light-transmitting opening exposing the light-emitting device of the green sub-pixel comprises a fifth arc-shaped edge and a fifth tip at an end of the fifth arc-shaped edge.

16. The display substrate according to claim 15, wherein the sub-pixel opening corresponding to the green sub-pixel comprises a sixth arc-shaped edge and a sixth tip at an end of the sixth arc-shaped edge,
a main body portion of a first electrode layer of a light-emitting device of the green sub-pixel comprises a seventh arc-shaped edge, and the seventh arc-shaped edge does not comprise a tip.

17. The display substrate according to claim 1, wherein the plurality of sub-pixels comprise a red sub-pixel, a green sub-pixel, and a blue sub-pixel;
a first light-transmitting opening exposing a light-emitting device of the red sub-pixel is substantially in a shape of a first racetrack;
a first light-transmitting opening exposing a light-emitting device of the green sub-pixel is substantially in a shape of a second racetrack, a length of a long axis of the second racetrack is smaller than a length of a long axis of the first racetrack, and a length of a short axis of the second racetrack is smaller than a length of a short axis of the first racetrack; or, the first light-transmitting opening exposing the light-emitting device of the green sub-pixel is substantially in a shape of a semi-racetrack; and
a first light-transmitting opening exposing a light-emitting device of the blue sub-pixel is substantially in a shape of a third racetrack, a length of a long axis of the third racetrack is smaller than the length of the long axis of the first racetrack, and a length of a short axis of the third racetrack is greater than the length of the short axis of the first racetrack.

18. The display substrate according to claim 2, wherein one red sub-pixel, two green sub-pixels, and one blue sub-pixel form one pixel unit, and a plurality of pixel units formed of the plurality of sub-pixels are arranged in an array on the base substrate.

19. A display device, comprising the display substrate according to claim 1.

* * * * *